(12) United States Patent
Bernardo et al.

(10) Patent No.: US 6,308,188 B1
(45) Date of Patent: Oct. 23, 2001

(54) SYSTEM AND METHOD FOR BUILDING A WEB SITE WITH AUTOMATED WORKFLOW

(75) Inventors: Richard S. Bernardo, Needham; Ben Rudnick, Arlington; Peter Soley, Cambridge, all of MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/100,116

(22) Filed: Jun. 19, 1998

Related U.S. Application Data

(60) Provisional application No. 60/050,154, filed on Jun. 19, 1997, and provisional application No. 60/050,153, filed on Jun. 19, 1997.

(51) Int. Cl.$^7$ ................................................. G06F 17/24
(52) U.S. Cl. ........................................... 707/530; 707/501
(58) Field of Search ................................. 707/501, 530, 707/517; 709/217, 218, 219; 345/331

(56) References Cited

U.S. PATENT DOCUMENTS

| | | | |
|---|---|---|---|
| 5,706,452 | * | 1/1998 | Ivanov ................................. 345/331 |
| 5,848,271 | * | 12/1998 | Caruso et al. ........................ 709/300 |
| 5,949,876 | * | 9/1999 | Ginter et al. ........................... 705/80 |

OTHER PUBLICATIONS

Balasubramanian, V., Alf Bashian, and Daniel Porcher. "A Large–Scale Hypermedia Application Using Document Management and Web Technologies." Proceedings of the Eighth ACM Conference on Hypertext (held Apr. 6–11, 1997). ACM. ©1997. pp. 134–145.*

Whitehead, E. James. "World Wide Web Distributed Authoring and Versioning (WebDAV): an Introduction." StandardView, Mar. 1997. vol. 5 No. 1. ACM. ©1997. pp. 3–8.*

Horstmann, Thilo, and Richard Bentley. "Distributed Authoring on the Web with the BSCW Shared Workspace System." StandardView, Mar. 1997. vol. 5 No. 1. ACM. ©1997. pp. 9–16.*

Graham, Ian S. HTML Sourcebook, Third Edition. John Wiley and Sons, Inc. ISBN 0–471–17575–7, ©1997, Published Feb. 24, 1997.*

Kraut, Carolyn. "Developer Tools for Building Better Web Sites," Iris Associates, Inc. ©1997.*

Printouts of three message board postings from domino.lotus.com dated Mar. 5, 1997, Apr. 12, 1997, and Apr. 24, 1997.*

\* cited by examiner

*Primary Examiner*—Stephen S. Hong
(74) *Attorney, Agent, or Firm*—Mintz, Levin, Cohn, Ferris, Glovsky and Popeo, P.C.

(57) ABSTRACT

A software tool is provided for use with a computer system for simplifying the creation of Web sites. The tool comprises a plurality of pre-stored templates, comprising HTML formatting code, text, fields and formulas. The templates preferably correspond to different types of Web pages and other features commonly found on or available to Web sites. Each feature may have various options. To create a web site, a Web site creator (the person using the tool to create a web site) is prompted by the tool through a series of views stored in the tool to select the features and options desired for the Web site. Based on these selections, the tool prompts the web site creator to supply data to populate fields of the templates determined by the tool to correspond to the selected features and options. Based on the identified templates and supplied data, the tool generates the customized Web site without the web site creator writing any HTML or other programming code. Automated work flow is enabled based on information supplied by the site creator during creation of the web site.

17 Claims, 31 Drawing Sheets

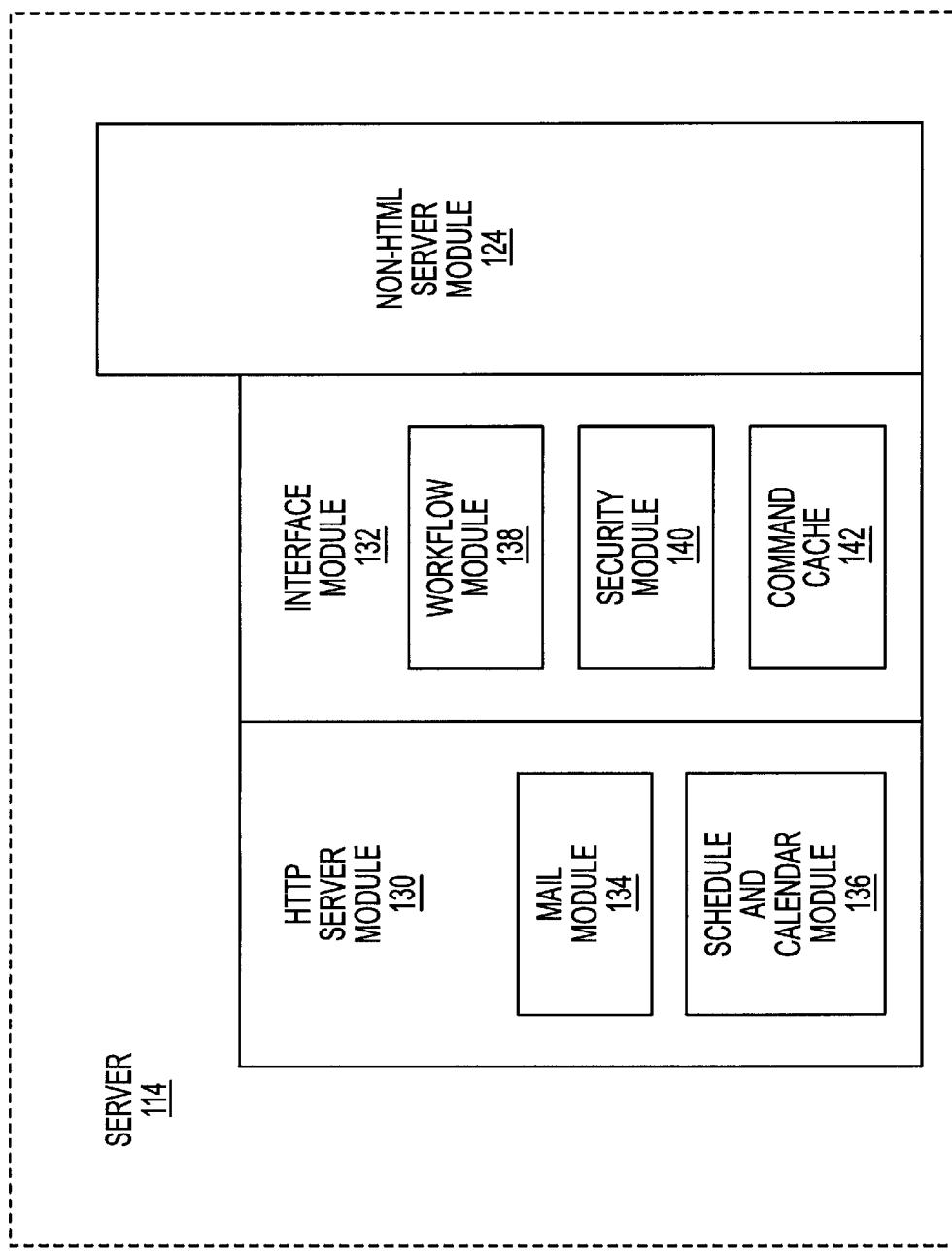

Buttons

Explanatory Text

Webmaster(s):
explanatory text regarding user
access to site
Company Name:
explanatory text regarding company name
Default Copyright Message:
explanatory text regarding copyright message
Company Contact Information:
explanatory text regarding
company contact information

Company Contact E-Mail Address:
explanatory text regarding email address user name company name copyright message Address
City, State/Providence
Zip/Postal Code
County
Phone
Fax email address

FIG. 6

Buttons

Explanatory Text

Frame Settings

Frame Layout: Explanatory text regarding frame layout

| frame choice |

Frame Style: Explanatory text regarding frame style

| style |

Logo: Explanatory text regarding logo style

| logo |

Document Settings:

Background Logo: Explanatory text regarding backgrounds attached to a Site Image document

| background |

Background Color: Explanatory text regarding background color

| color |

Text Color:

| color |

FIG. 8

Buttons

Explanatory Text

Names:  Function:

Step 1  [user name]  ☐ Function  [function]

Step 2  [          ]  ☐ Function  [        ]

Alternate:  [          ]  ☐ Function  [        ]

Automatic notification:
Text explanation regarding automatic notification   ○Yes  ○No

FIG. 12

```
Buttons
```

2. Home Update
    1. Home Update Site
        1. Home Update Site Co Info
            1. Home Update Site Co Info Site Profile (PIN: wwwSiteProfile-flag:)
            2. Home Update Site Co Info Site Profile Finish (PIN: Home Update Site Co Info Site)

2. Home Update Site Security
        3. Home Update Site Design
            1. Home Update Site Design Center (PIN: wwwDesign CenterProfile - flag:)
            2. Home Update Site Design CenterFinish (PIN: Home Update Site Design Center)

4. Home Update Site Areas
    2. Home Update Area
        1. Home Update Area Security
        2. Home Update Area Page Design
        3. Home Update Page Copyright
        4. Home Update Area

FIG. 21

Create Document Library Page

Select Logo or Banner: | logo

Title:* | title

Subtitle: | subtitle

FIG. 22

Internal Name:
Enter the internal name of the object
Multiple Object Lookup Name:
Usually the same as Internal Name. In some cases it is used to allow for one object to be looked up multiple ways.
External Name:
Enter the external name of this object.

| ContractsHomePage |
| AreaHomePage |
| Contracts Main Page |

FIG. 23

Primary Area Internal Name:
Enter the internal name of the primary area this object goes with.

Primary Area External Name:
Enter the external name of the primary area this object goes with.

Area(s) belong:
Enter the area(s) that this object goes with (AppAssembler will copy this document to these areas).

| Contracts |
| Contracts Area |
| Contracts |

FIG. 24

Domino Library - Design

→ Folders and Views
　　Agents
↓ Design
　　Forms
　　Subforms

Other Options
Other Options

Other Options

Other Options
[ Display Side Bullet Text1 ]
Other Options

Other Options
Other Options
Other Options

FIG. 28

SYSTEM AND METHOD FOR BUILDING A WEB SITE WITH AUTOMATED WORKFLOW

RELATED APPLICATIONS

This application claims priority based on U.S. Provisional Patent Application Serial No. 60/050,154. entitled "Web Site Creation Development Tool," filed Jun. 19, 1997. This application is also related to co-pending U.S. Patent Applications entitled, "Web Site Creator," "System and Method for Building a Web Site Using Stored Pages," "Automated System and Method for Approving Web Site Content," "System and Method for Building a Web Site Using User Specific Interface," "System and Method for Building a Web Site With Automated Help," "System and Method for Building a Web site for Use in E-Commerce With User Specific Pricing," "System and Method for Building a Web Site With Automated Workflow," And also claims priorty on Ser. No. 60/050,153 filed Jun. 19, 1997.

FIELD OF THE INVENTION

The invention relates to a Web site creation tool that enables automated, distributed work flow while creating a Web site or Web site contented.

BACKGROUND OF THE INVENTION

With the proliferation of the Internet and intranets, there has been an increasing demand for the creation of Web sites. A Web site typically includes a collection of web pages in HTML. format. Each page includes content, such as text, graphics, or other multimedia material. The page may also include links and buttons (e.g., "Submit").

Creating a web site typically requires generating a plurality of pages using HTML. Adding content to a web site once created or modifying the web site also involves using HTML. This makes it difficult for individuals without specific HTML knowledge to create a web site or to create content for or modify an existing web site.

Another difficulty encountered in Web site creation and subsequent modification arises from the fact that often several individuals are involved in creating and authorizing the Web pages. Often, the format and content of Web pages involves the collaboration of many individuals. For example, one or more persons may propose the text for a page another may be responsible for graphics, another may add appropriate legal notices (e.g., trademark or copyright notices), etc. In such cases, coordinating the collaborative effort may be difficult and if done manually can cause delays. A manual approach also makes it difficult to adequately track development, or ensure that all contributions are timely and properly integrated in the Web site. Similar problems are posed in connection with ensuring that all requisite approvals are obtained by authorized content approvers prior to posting the final version of the content to the Web site.

Another drawback of known Web sites is the relatively inflexible security features. Typically, either a person trying to access a Web site or an area of a Web site has access or not. Additionally, all users authorized typically are provided the same information. Existing Web sites are generally incapable of identifying a user and automatically providing information specific to the user. Thus, the host typically limits information provided on the site to that which can be made generally available to all authorized users. This limits flexibility in customizing the types of information presented to different categories of users. Other drawbacks exist.

SUMMARY OF THE INVENTION

One object of the invention is to overcome these and other deficiencies and drawbacks of existing web site creation tools, systems and methods.

Another object of the invention is to provide a tool for creating a Web site that minimizes or eliminates the need for a Web site creator to know or use HTML, or other programming languages to create a Web site.

Another object of the invention is to provide a tool for facilitating the creation of Web sites and pages based on stored templates that enable personalization and customization of the Web site and pages without the need for a user to change or write any software code.

Another object of the invention is to provide a tool for facilitating the creation of Web sites and pages by taking a web site creator through a series of views, each having one or more options/features, to enable the site creator to select from a plurality of options/features available for the web site layout, content and functionality.

Another object of the invention is to provide a tool for creating a Web site where the tool comprises a library of stored templates (including fields) associated with different options/features for a Web site, the tool prompts a user of the tool to select desired options/features from a list of possible options/features. Based upon the option/features selected, the tool determines which of the stored templates (and fields) are to be used and the user is prompted to supply data to populate those fields. The tool uses the templates and user supplied data to create the web pages that make up a Web site. The Web site may then be posted on a network, such as the Internet.

Another object of the invention is to provide a tool for facilitating the creation of Web pages with templates for predefined Web pages that enables personalization and customization of the Web pages without the need for the user to change or write any software code, and facilitates the inclusion or modification of graphical and other multimedia objects.

Another object of the invention is to provide a tool for facilitating the posting of content to an already created Web site, where pages corresponding to the content are dynamically rendered on-the-fly.

Another object of the invention is to provide a tool for facilitating the creation of content for a Web site with an automated content approval feature whereby authorized content creators (specified during creation of the Web site) can create proposed content for the Web site. Upon creation, the proposed content may be automatically, electronically routed to one or more content approvers specified during creation of the web site for authorization before posting the content on the Web site. The approved web page may be automatically posted as appropriate.

Another object of the invention is to provide a tool that facilitates the modification of Web pages in a finished Web site including one or more of the above objects, without requiring a content creator to change or write any software code.

Another object of the invention is to provide a tool for facilitating the creation of a Web site based on stored templates whereby once the site is created, a content creator can selectively modify individual pages or groups of pages without using HTML or other software programming code.

These and other objects are accomplished by various embodiments of the invention. According to one embodiment of the invention, a software tool is provided for use with a computer system for simplifying the creation of Web sites. The tool comprises a plurality of prestored HTML templates, each having various fields. The templates preferably correspond to different types of Web pages and other features commonly found on or available to Web sites. Each feature may have various options. To create a web site, a Web site creator (the person using the tool to create a web site) is prompted by the tool through a series of views stored in the tool to select the features and options desired for the Web site. Based on these selections, the tool prompts the web site creator to supply data to populate fields of the templates determined by the tool to correspond to the selected features and options. Based on the identified templates and supplied data, the tool generates the customized Web site without the web site creator writing any HTML or other programming code.

The features and options may include, for example, site areas, specific security features, enablement of distributed authorship with the ability to specify approved content authors and content approvers, the specification workflow/approval procedures, enablement of automatic workflow routing, and a graphical design center with a plurality of predetermined user selectable features.

A Web site created with the tool has several advantageous features. For example, the system and method of this invention may include a workflow server which automatically routes proposed content created by authorized content creators through a series of authorized content approvers for review, edit and approval. The users authorized content creators and content approvers preferably are specified during creation of the web site.

The invention also provides a tool for facilitating the creation of Web pages permits collaboration and distributed authorship. Different content creators can collaborate on the creation of content for Web pages at the same time.

According to another feature of the invention, the tool permits authorized content creators to preview proposed content as it is being created by rendering pages on-the-fly. Additionally, the tool enables a content creator to see how the proposed content will look using various browsers and browser settings.

BRIEF DESCRIPTION OF THE DRAWINGS

FIG. 1A depicts a schematic block diagram illustrating an overall system in accordance with one embodiment of the invention.

FIG. 6 is an illustration depicting a screen showing information input fields.

FIG. 8 is an illustration depicting a screen showing a selection menu.

FIG. 12 is an illustration depicting a screen showing information input fields.

FIG. 21 is an illustration depicting a screen showing various source documents.

FIG. 22 is an illustration depicting a screen showing information input fields.

FIG. 23 is an illustration depicting a screen showing information input fields.

FIG. 24 is an illustration depicting a screen showing information input fields.

FIG. 28 is an illustration depicting a screen showing options.

DESCRIPTION OF THE PREFERRED EMBODIMENTS

One embodiment of the invention provides a tool, system and method for creating Web sites. The tool facilitates the creation of a customized Web site without requiring a Web site creator to write or edit HTML code. A Web site created with the tool has several advantages that can be exploited after the Web site is created. The tool also enables various advantages in connection with modifying a Web site created using the tool.

Figure 1:
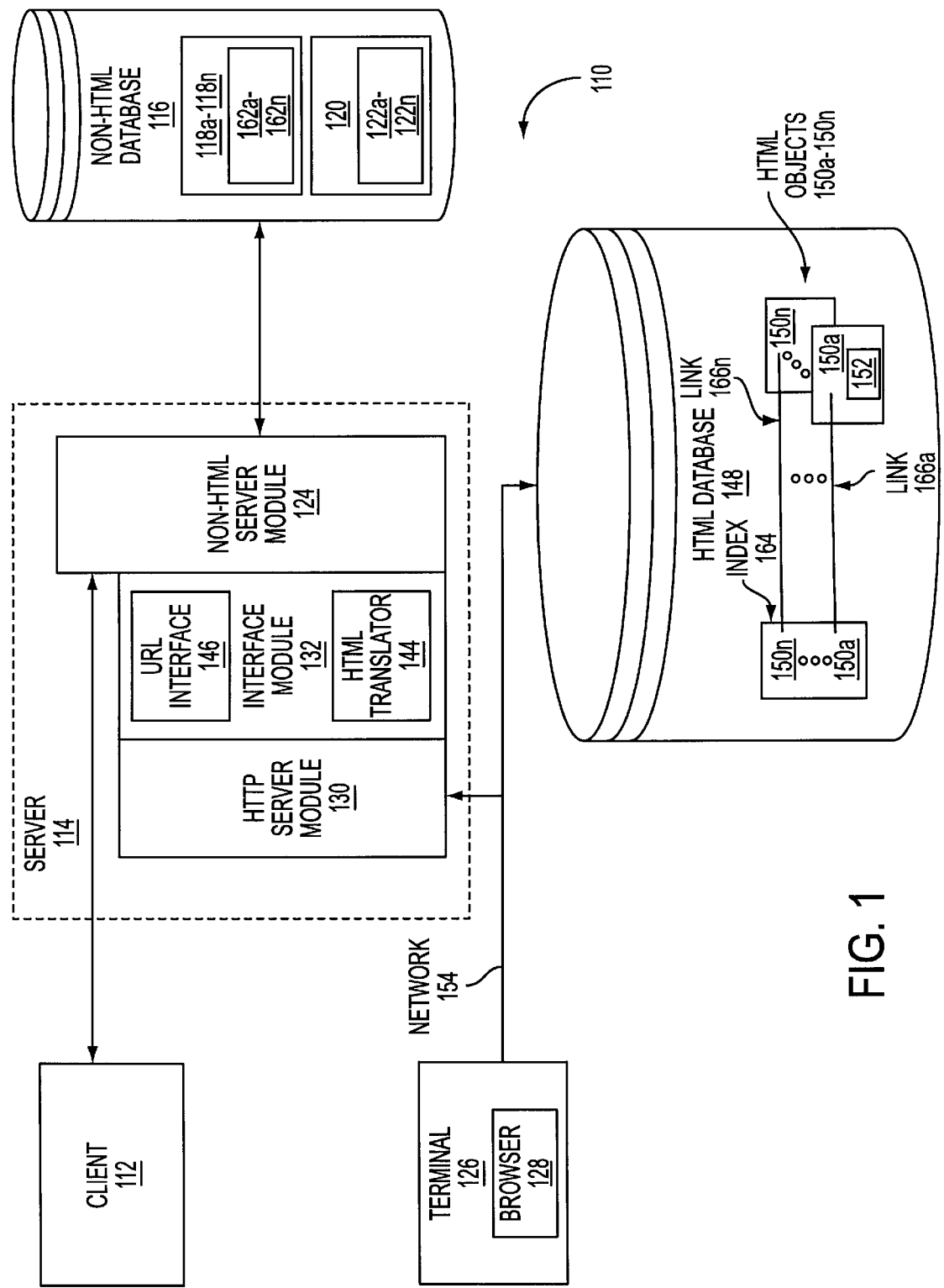
FIG. 1 is a schematic block diagram illustrating an overall system in accordance with one embodiment of the invention.

As schematically illustrated in the block diagram of FIG. 1, one aspect of the invention relates to a client/server network system 110 enabling access to both HTML objects 150a–150n (e.g., HTML documents) and non-HTML objects 118a–118n using a web browser 128 residing on a terminal 126. Preferably, web browser 128 supports Internet and Web protocols (e.g., HyperText Transfer Protocol (HTTP) and TCP/IP). The system may further comprise a client 112 to enable a non-browser client access to non-HTML server module 124 to retrieve non-HTML objects 118a–118n from non-HTML, database 116.

A server 114 preferably comprises a HTTP server module 130, interface module 132 and non-HTML server module 124. As further illustrated in FIG. 1, the server side of system 110 may comprise a non-HTML database 116 in communication with server 114. Preferably, non-HTML database 116 stores one or more non-HTML objects 118a–118n, each at least some of which having one or more non-HTML fields 162a–162n, and a user directory 120. User directory 120 includes one or more user objects 122a–122n. User objects 122a–122n may include information about a user (e.g., electronic mail address, role, profile, etc.). Terminal 126 and server 114 can be in communication via a network 154 (e.g., Internet, Intranet or other network).

According to one aspect of the invention, a user submits a URL-based request for an object via browser 128. The request is passed to server 114 using HTTP (or other protocol). Server 114 receives the request via HTTP server module 130 and passes object location information to interface module 132 via URL interface 146. URL interface 146 transmits that information to non-HTML, server module 124. Non-HTML, server module 124 retrieves the requested object and passes it to interface module 132. A HTML translator portion 144 of interface module 132 translates the non-HTML object to a HTML representation of the requested object and the HTML, representation is returned to browser 128 via HTTP server module 130.

System 110 also enables browser 128 to access HTML objects 150a–150n using HTTP server 130 or a conventional web server 156 in a known manuer. A conventional editor may be used to edit HTML objects within the system. A conventional technique (e.g., a computer gateway interface (CGI)) may be used to store the edited HTML, objects in the HTML database.

Thus, one advantage of the invention is that server 114 enables a browser 128 to request both HTML objects 150a–150n and non-HTML objects 118a–118n. Additional advantages derive from this capability. For example, one significant advantage is that the invention exposes powerful resources available in non-HTML, databases 116 to a web browser 128 according to one embodiment of the invention.

Figure 2:
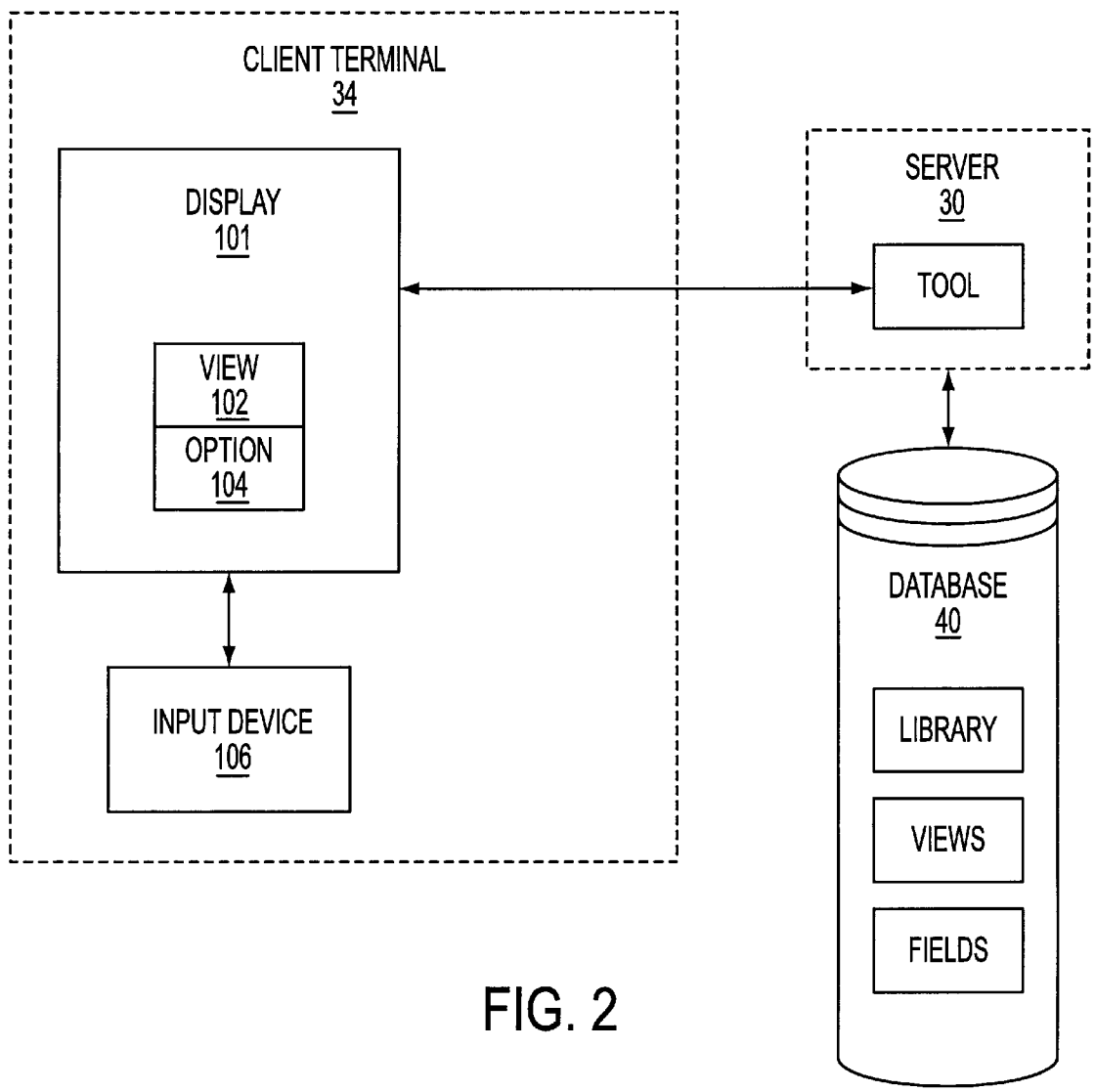
FIG. 2 is a schematic block diagram illustrating an overall system in accordance with one embodiment of the invention.

According to one embodiment of the invention shown in FIG. 2, the tool may be installed on a server 30. Installation of the tool on other types computer systems is also possible. Server 30 may be connected to various client terminals 34. Typically, client terminal 34 may include a display 101 capable of presenting views 102. Terminal 34 may also preferably include an input device 106. The tool preferably is able to access a database 40 wherein a library of templates, views, and fields may be stored.

According to one embodiment of the invention, the tool enables a Web site creator to select from among a plurality of features and options to include within a Web site. The tool further comprises a library of templates (eg., text, fields, HTML code and formulas) that correspond to the available features and options. The templates comprise databases which may include fields, forms, views, text, formulas and profiles that enable customization of the features. A profile may comprise fields, some of which may be designated as required fields. For example, one feature of a Web site may be a list of site areas. One area may be "Company Information." A template corresponding to this feature may include certain text and HTML formatting components for a Web page for this area, with fields for company name, address, contact person, etc. Based on input supplied by the Web site creator, this information may be included in the finished Web site without requiring the Web site creator to write or edit HTML code. The tool provides several stored views to present the various options/features to the Web site creator so that the site creator may select the options/features desired for inclusion in the Web site. The tool has an application assembler module that combines the templates for the selected features/options with data input by the site creator to generate Web pages to thereby construct a complete Web site. The tool preferably comprises a software program for use on a computer network. The tool may be accessed through a suitable network interface. For example, a network browser may be used to access the tool. According to a preferred embodiment, the software tool runs on a Lotus Domino Server platform.

Figure 3:
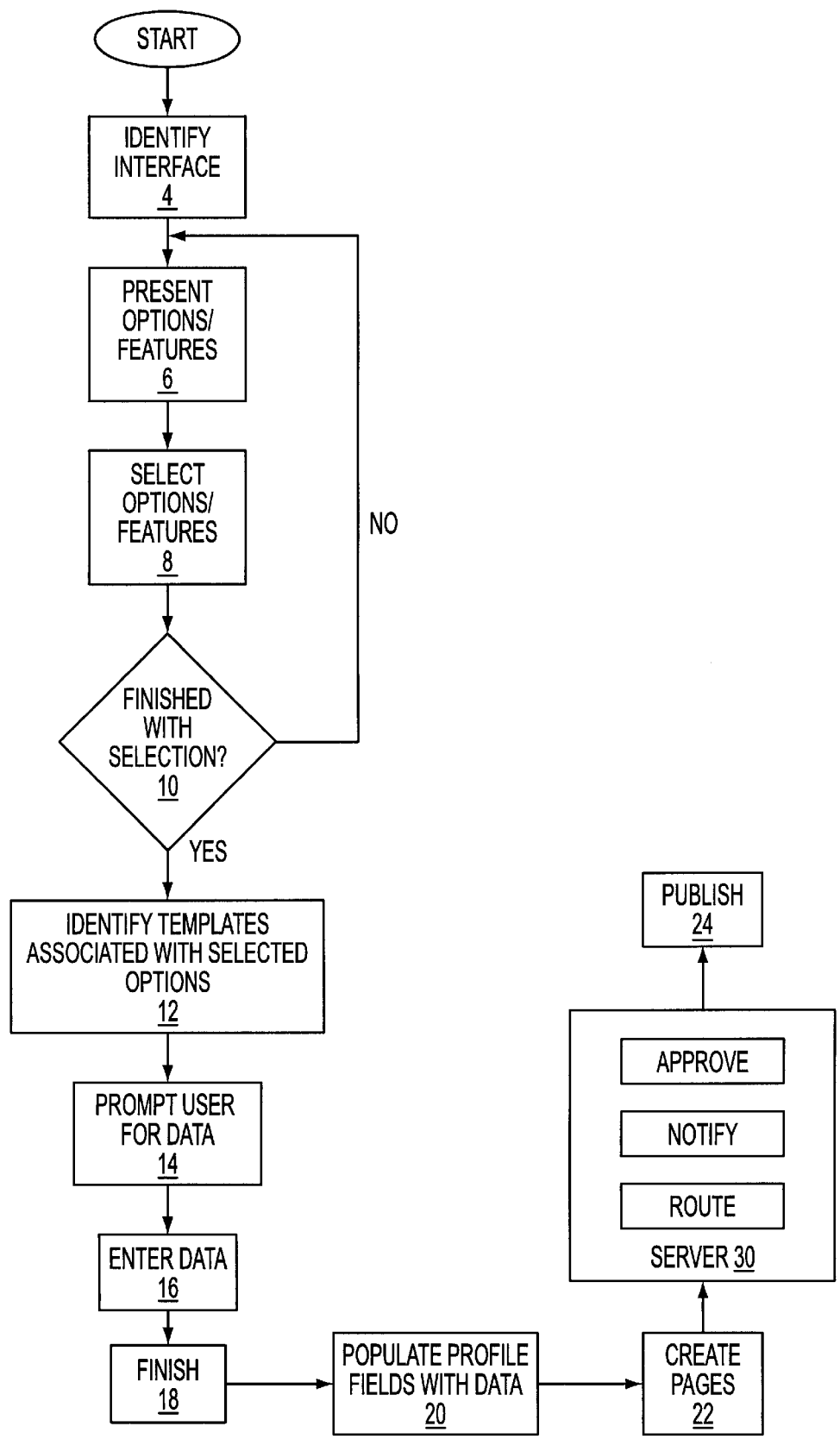
FIG. 3 is a schematic flow diagram illustrating one embodiment of the site creation process.

According to one embodiment of the invention, a site creator may construct a Web site in a manner represented in FIG. 3. A site creator may start the process, for example, by directing a network browser to access a server, or other network node, on which the tool is loaded. The tool identifies the interface the site creator is using (step 4). Preferably, the tool automatically identifies the browser type being used and may present different views for different browser types. For example, the tool may present views that have certain common codes for all browsers and some browser-specific code based on the specific browser type identified.

Figure 4:
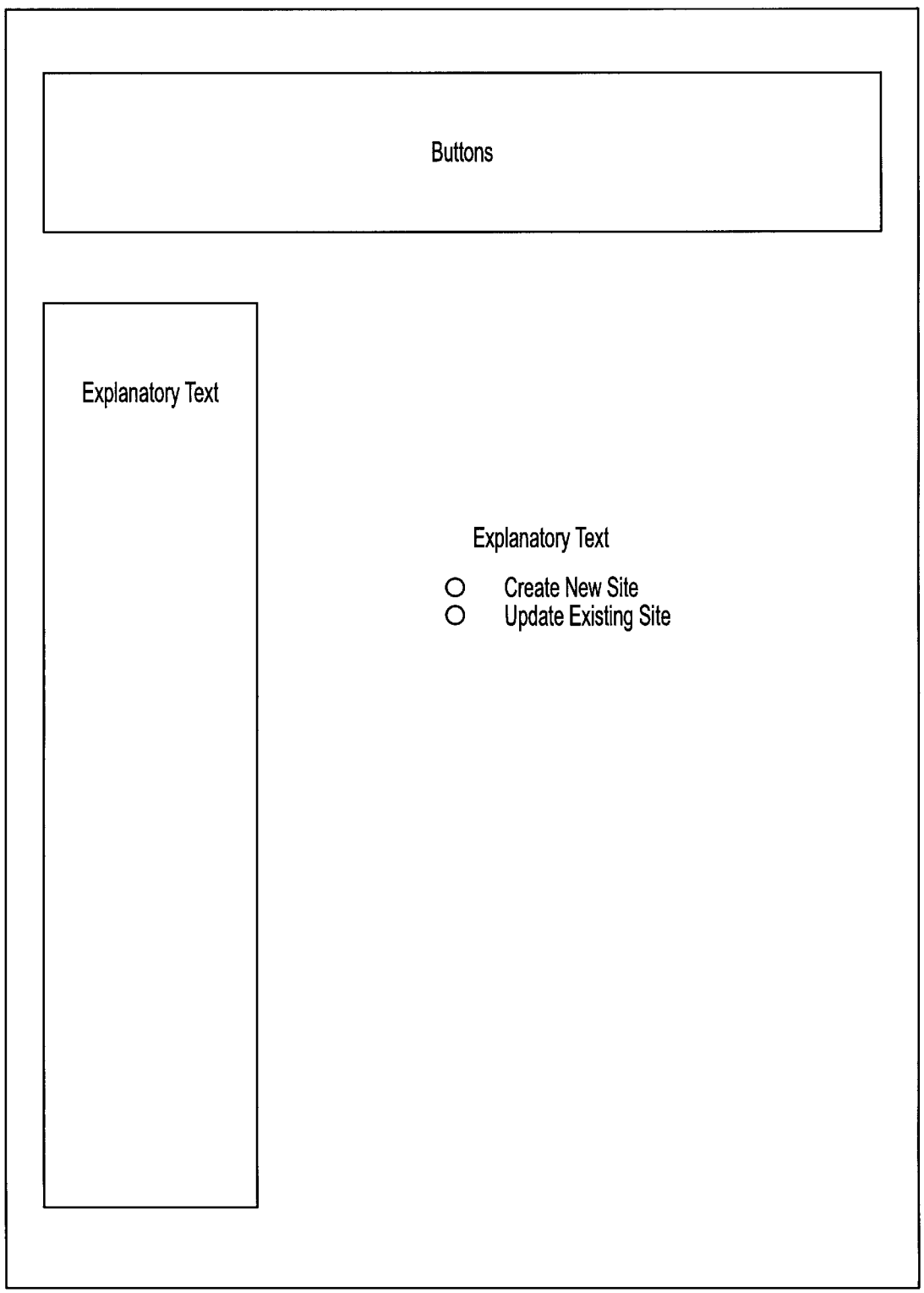
FIG. 4 is an illustration depicting a screen showing a selection menu.

At step 6 a site creator is presented with one or more views. The view(s) preferably presents a screen containing a menu of features and/or options for creating and customizing the Web site. For example, FIG. 4 depicts an example of one view presented to a site creator. As shown, a view may include certain command initiators (e.g., buttons to click on), explanatory text fields to explain the objective or function of various aspects of the view and one or more feature(s) or option(s) to be selected. As shown, the user may be prompted to select whether to create a new site or edit an existing one. Assuming the new site option is selected, the next view(s) may comprise features/options from which the site creator can select to customize the features/options appearing on the Web site. The features/options may pertain to those found on Web sites or other features/options. For example, the features/options may include a list of site areas, Web pages to include in a Web site, Web page formatting options, security links, colors, borders, buttons, workflow commands, graphics, backgrounds, text and other items. Some features or options may be required and some may be discretionary.

Figure 5:
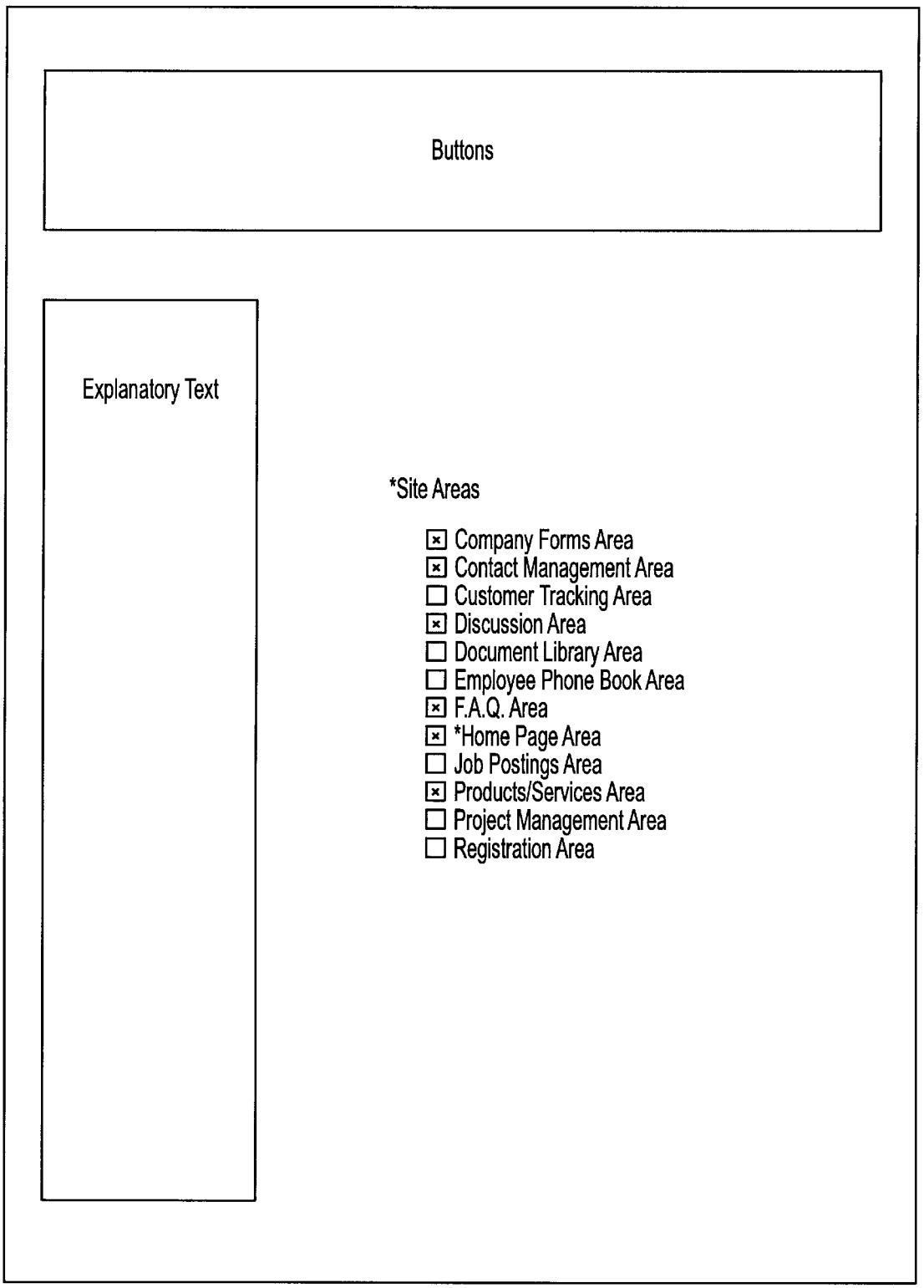
FIG. 5 is an illustration depicting a screen showing a site area selection menu.

For example, FIG. 5 depicts the feature of Web site areas. As shown in FIG. 5, the site area options may include a list of predefined site areas such as Company Forms Area, Contact Management Area, Customer Tracking Area, Discussion Area, Document Library Area, Employee Phone Book Area, Frequently Asked Questions (FAQs) Area, Home Page Area, Job Postings Area, Products/Services Area, Project Management Area and Registration Area. Other areas may be created based on templates for these areas, without requiring the Web site creator to write or edit software code.

At step 8, a site creator may select the desired features/options. Selection may be accomplished in any suitable manner. For example, selection may be accomplished by using a graphic interface and selection device (e.g., by pointing a cursor at the selection and clicking on it), by entering text, or by other techniques. As shown in FIG. 5, desired site areas may be selected by entering an "X" in a check box. At step 10 it may be determined whether all selections have been made. If additional features/options are to be presented, the process returns to step 6 and repeats until all selections have been made and the process proceeds to step 12.

At step 12, the tool identifies which templates in a library of stored templates are associated with the features/options selected in step(s) 8. Upon identification of the associated templates, the tool may determine certain fields (required or desired) relevant to completing each template. At step 14, the site creator may be prompted for certain data to complete the template fields. For example, FIG. 6 shows an example of a view requesting data input from the site creator. The requested data may include fields such as company name contact information, e-mail addresses and other information. Some fields may be required (e.g., marked by an * and others may be optional). At step 16, the site creator may input the data for the requested fields and other data needed or desired to include within the Web site. At step 18 a site creator may signal the tool to finish the creation of the Web site. Signaling may be accomplished in any suitable fashion. For example, a creator may use a graphic interface and selection device to select an object (e.g., a button) to signal the tool to finish.

Figure 30:
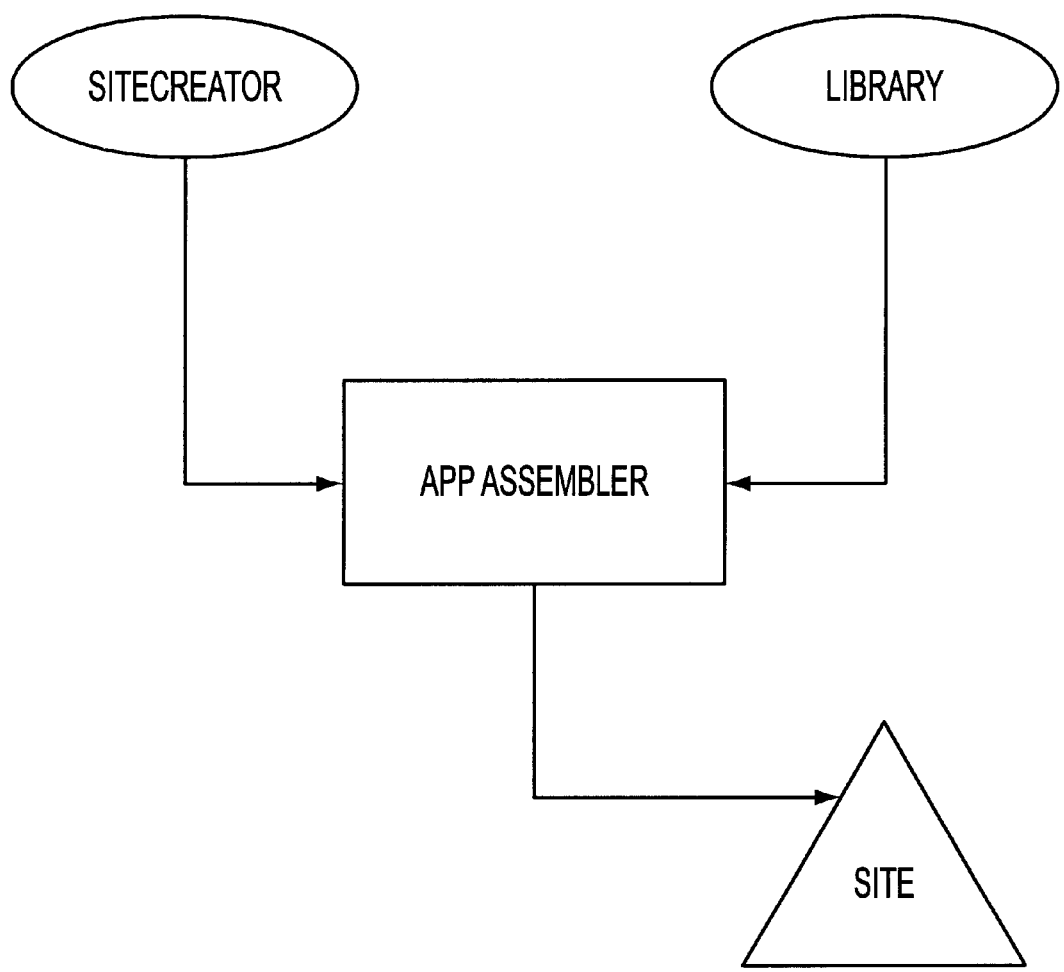
FIG. 30 is a block diagram illustrating the AppAssembler.

At step 20 the tool may populate template profile fields with the collected data. The database templates may preferably be constructed using an applicagtion assembly engine, for example, AppAseembler (see, FIG. 30). The database preferably stores the various templates. profiles, forms and views. Initiating the tool to finish the Web site may cause input data to populate the profiles and fields. Some fields, preferably optional fields, contain default data. Upon population of the fields and profiles the Web pages may be constructed. As shown at step 22, the tool may create Web pages from the templates corresponding to the selected features and the input data. The created Web site may then be forwarded to server 30. Server 30 may comprise an approving module which may use a routing module to route the proposed Web site (or pages thereof) to predetermined users for review, edit, and approval. Approving module may include a notifying module which may notify certain predetermined users of various events. For example, certain users may be notified of a received request for approval, the amount time in which action must be taken, or other information. Routing module may send the Web site/pages to each of the predetermined users (which may be designated in a particular order) for completing the approval process. Once the approval process is complete, routing module may, at step 24, send the approved (and possibly revised) Web site/pages to server 30 for posting on a network.

By way of example, one embodiment of the invention may be implemented as follows. FIG. 4 shows a portion of a view (e.g., view 102) prompting a user to choose the option (e.g., option 104) for creating a new Web site or updating an existing site. The choice is made, for example, by using a computer mouse and clicking on one of the radio buttons adjacent the desired choice, although other methods may also be used. A text box on the view may be provided to explain each of the options available to the user. A similar dialog box may be provided on subsequent screens as well.

Figure 7:
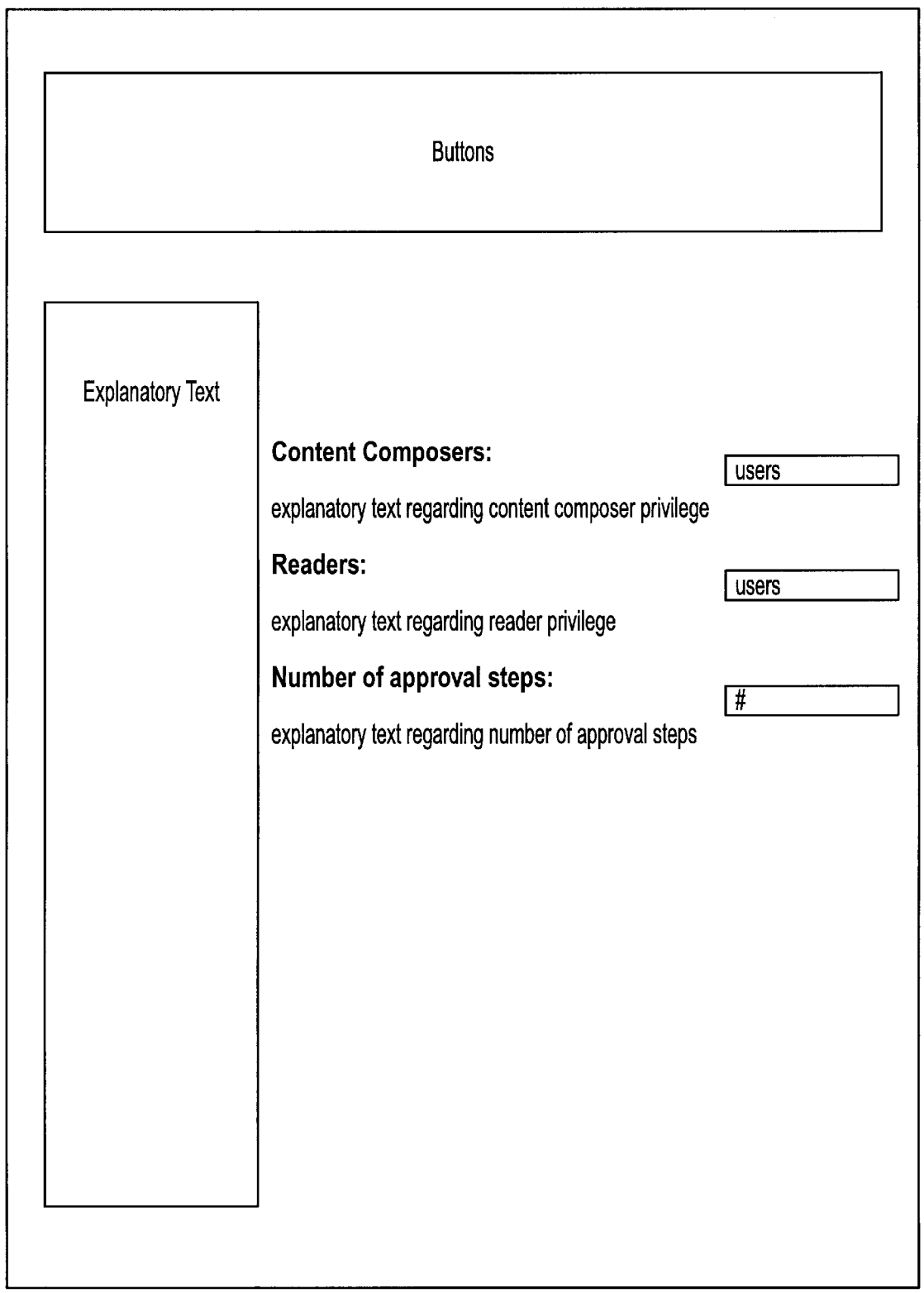
FIG. 7 is an illustration depicting a screen showing information input fields.

If the option to create a new site is selected, the user may be presented with another view, such as shown in FIG. 5. FIG. 5 shows the types of site area options which a user can choose to have included in a Web site. Some of these site areas may be designated as required areas. The user may select the desired options. Next, the user may be presented with a view presenting options for entry of information based on the selected site areas and/or other information. FIG. 6 shows the view displaying the options for input fields for basic information about a company or business. FIG. 7 shows a view presenting a users options to designate certain individuals as authorized content composers, authorized readers (described below), and the number of steps involved in the content approval process. These settings may determine a portion of the security workflow and approval features for the site. Other features may be presented once the features are selected and data requested the user activates a "finish" button to cause the Web site to be created.

FIG. 8 illustrates another aspect of the web site development module. This design center feature provides a screen from which the user is prompted to decide on the options for the design of the web page, for example, by selecting colors, background images, frame styles, and logos. Once selections have been made, the user can preview the design and then make changes as desired. The module essentially provides simple-to-use graphic design tools allowing a site creator to have a preferred layout and design, without writing or editing HTML or other code.

Figure 9:
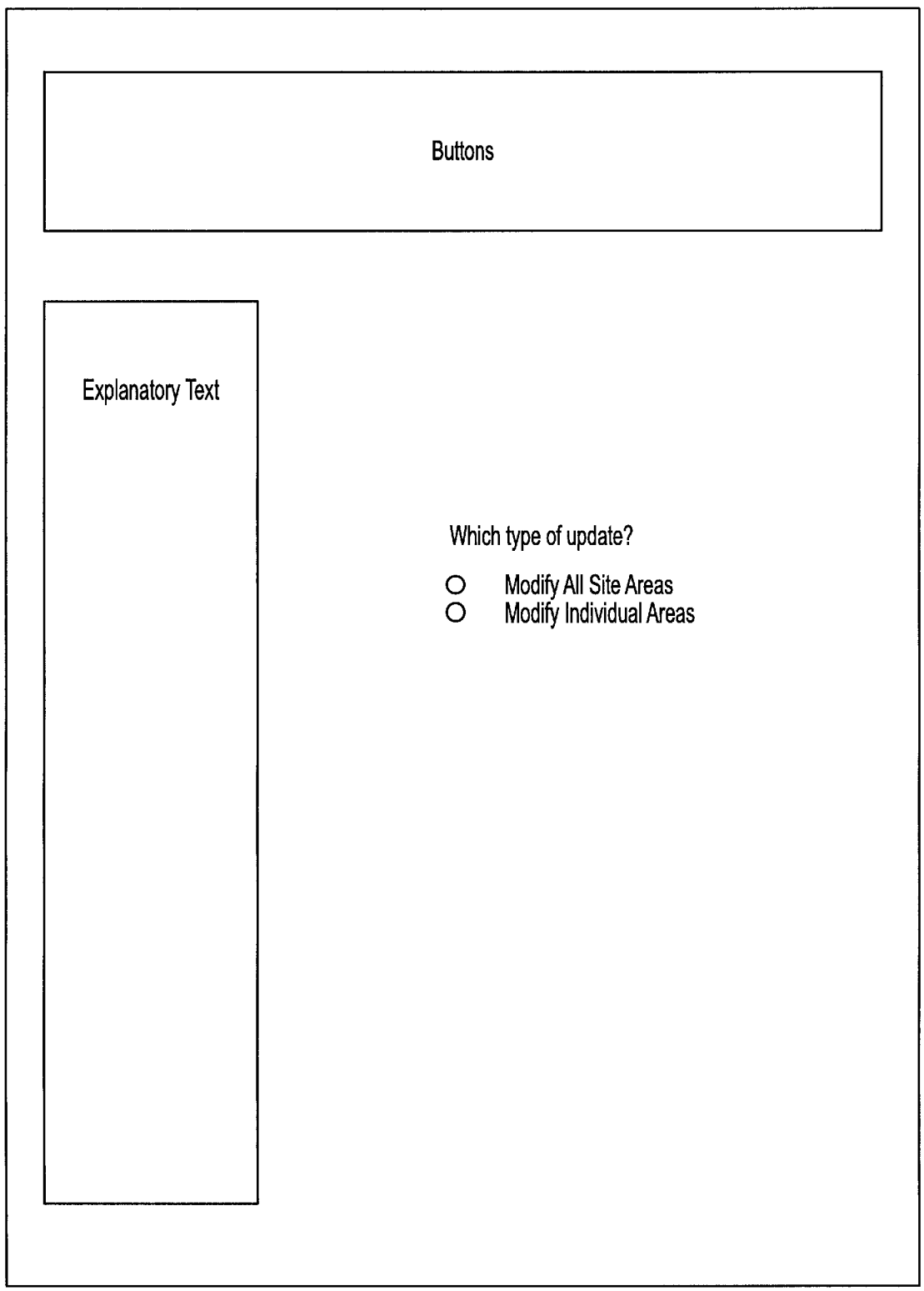
FIG. 9 is an illustration depicting a screen showing a selection menu.

Once the site is created an authorized user (e.g., a web master) may make changes to the Web site using the tool. As shown in FIG. 9, an authorized user may be presented a view requesting the selection of the option to modify an individual area of the web site or to modify all of the site areas. This allows an authorized user the flexibility to change a specified page or area (e.g., changing a look to a product in the Products area) or to modify the entire site (e.g., incorporating a new company logo onto all of the relevant site pages). This feature is enabled by storing the "logo" field data as an object and linking to that object from each page that includes the logo. The linking is part of the template so that no code needs to be written by the Web site creator or content composer.

When modifying content, it may be preferable to use a pre-designed workflow process. For example, the content composer may create a proposed new Web page for inclusion in the site. Prior to posting the created Web page on a network (e.g., the Internet or an intranet), the proposed Web page may be contributed to, reviewed, edited, and approved by a number of other authorized users. A workflow module may be used to route the proposed content to other users. Once content has been approved for posting, the workflow module may post the content on the Web site via a network.

FIG. 1A is a schematic block diagram illustrating a web server in accordance with one embodiment of the invention. Web server 114 may comprise a HTTP server 130 in communication with an interface module 132, which in turn is in communication with a non-HTML server module 124. HTTP server 130 may comprise a mail application module 134 and a schedule and calendar application module 136. Interface module 132 may comprise a workflow module 138, security module 140 and command cache 142. Workflow module 138 is used to automate various tasks upon the occurrence of predetermined events. Security module 140 enables access control to non-HTML objects using role-based multi-level security. Command cache is used to store commands input by a user.

In operation server 114 receives a URL-based request for a non-HTML object from a web browser via HTTP server module 130. HTTP server module 130 receives the request and extracts object information from the URL. HTTP server module 130 passes the information to interface module 132. Interface module 132 converts the URL-based request to a format supported by non-HTML server module 124 and communicates the request to non-HTML server module 124. Non-HTML server module 124 then locates and retrieves the object requested.

Figure 10:
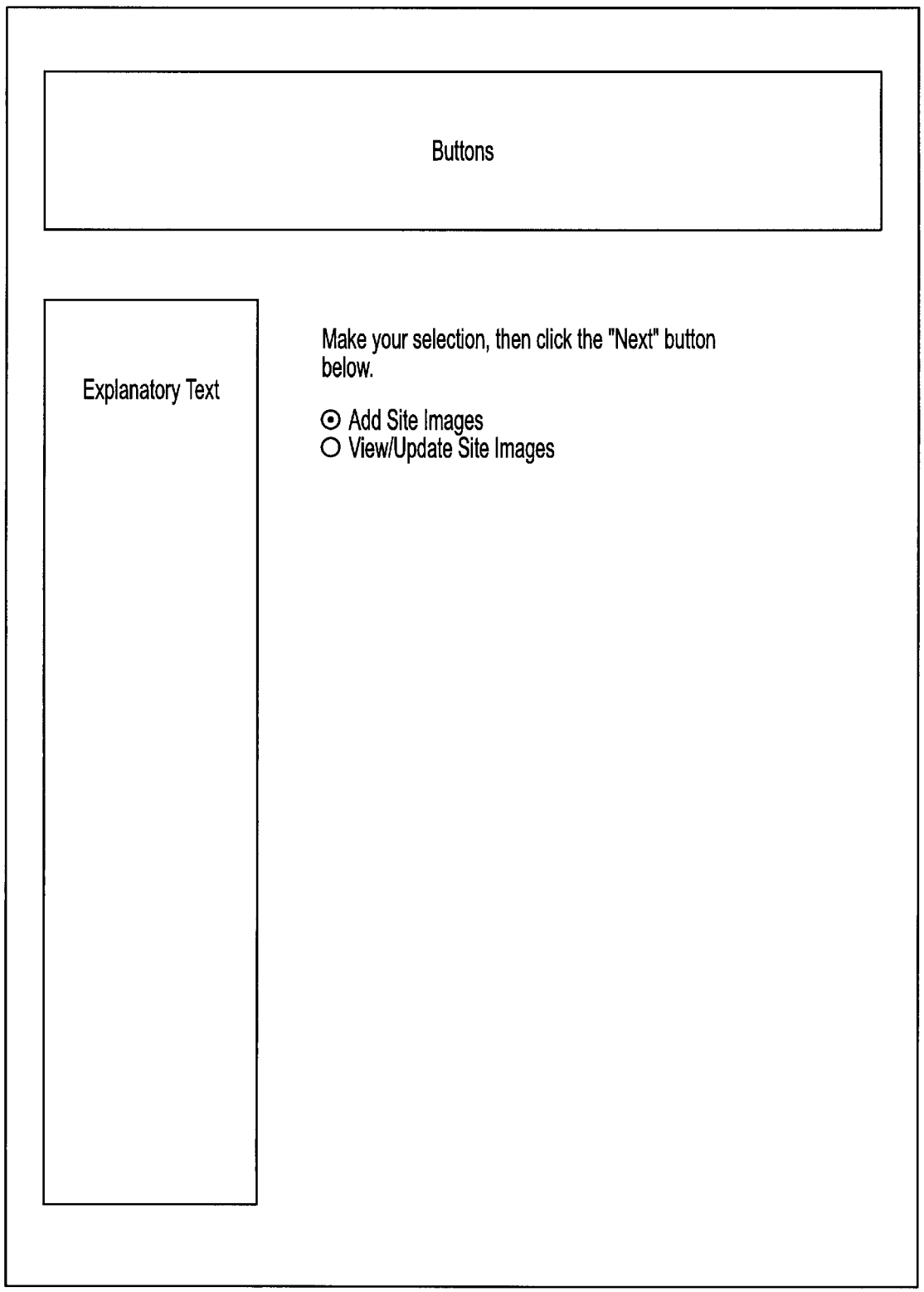
FIG. 10 is an illustration depicting a screen showing a selection menu.

To facilitate modifying the site the content composer may be presented various views by the tool to add or modify pages. The view may be any type of graphical or text arrangement that provides a user with several options. For example, view may include a drop down or pop up menu, a list of options to be selected using a radio button selector, a text entry box, or other suitable graphical selection interface. Options present a user with various choices regarding the creation of a Web site and can be based on stored templates. For example, options may include choices regarding editing of text, colors, graphics or other objects, as well as, choices regarding positioning of objects, creation of new objects, deleting objects, adding links to other sites, security provisions and other choices. For example, FIG. 10 depicts a view that enables a content composer to add site images or to view/update site images. As illustrated the content composer selected the "add site images."

Figure 11:
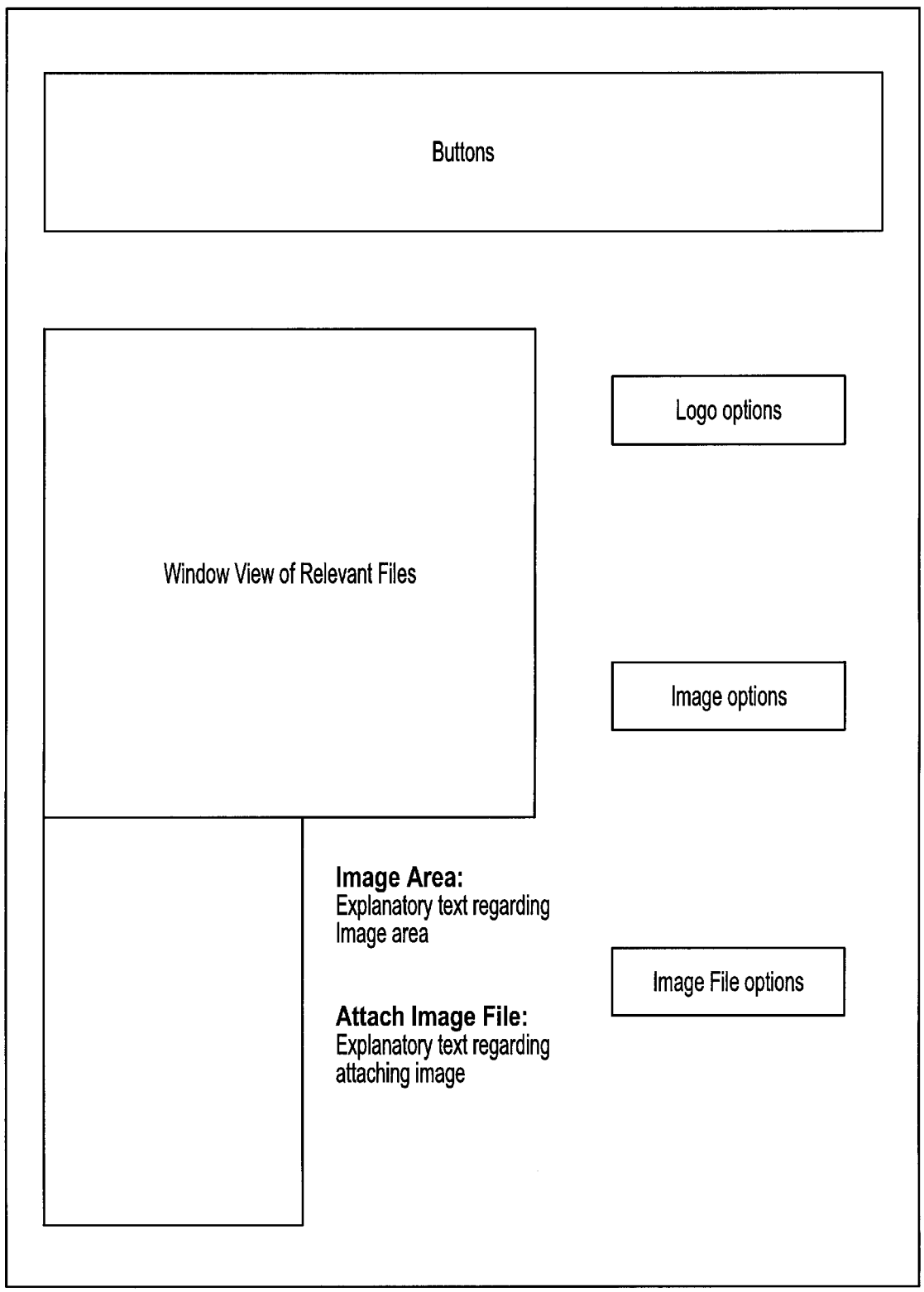
FIG. 11 is an illustration depicting a screen showing information input fields.

FIG. 11 shows selection of a source document from which object images may be added to a Web site. The content creator may be presented this type of view when adding images stored elsewhere on a network. FIG. 11 depicts various selections/inputs to be made. Based on a template for adding an image and the users input, images may be added without writing or editing code.

Some embodiments of the invention may include a preview function. A preview function may enable the user to view the Web page as it is created. For example as various options are selected, a preview of the option(s) selected may be displayed for a user to observe. This ability is provided by the tool based on the templates without requiring the user to close the file and reopen it with a browser as would be the case if the user were writing HTML code. Thus, the tool enables pages/objects to be rendered on-the-fly.

The Web site created using the above Web site creation/ editing tool offers several advantages, both during creation, and after the Web site is posted. Some of these advantages are described below.

Automated Workflow

One embodiment of the invention presents certain features which enable advantageous workflow management. For example, a company may desire to create/edit Web site content. The Web site may preferably include various images, logos, text, graphics, and other content. A company may assign various tasks pertaining to the content creation/ editing to various personnel. For example, a Graphics Department may be assigned the task of creating a logo, a Sales department may be assigned to provide pricing information, a Legal department may be assigned to provide various copyright information and other departments may receive other assignments. A user with appropriate privileges may assign these an other tasks by selecting various options 104 during the creation of the Web site content. Options 104 may include routing instruction (e.g., route the assignment to Graphics, then Legal, then Sales, etc.), time requirements (e.g., Graphics has ten days to review/edit, Legal has one day, etc.), notification requirements (e.g., Sales will be notified when Graphics has completed its task, etc.) and other workflow options. A user may use input device 106 to select certain options 104. Selection of an option 104 may enable the tool to access database 40 and return information. Selection of an option 104 may also enable a workflow module to access server 40 and coordinate certain workflow options. As the work progresses Web site content may be routed through the network in order to the accomplish the various tasks. Upon completion of various tasks, the Web site content may be consolidated and posted on a network.

Approving Web Site Content

Some embodiments of the Web site creation tool provide for an approval process to coordinate the creation/editing of a Web site. One embodiment of the invention preferably includes a user directory, including a list (e.g., an access control list) or database of users, each user having an assigned privilege level. The database (e.g., database 40) may be accessible by the Web site creation tool access control list. The database may be created during the Web site creation process using a series of views 102 that include various options 104 pertaining to user privileges. The user may interactively use an input device 106 to select various options 104, thereby, designating various privilege categories. For example, privileges pertaining to Web site creating, editing, approving, posting, viewing and other similar functions may be assigned.

When a Web page is created (or alternatively, when an existing Web page is edited) the process for approving the Web page is preferably achieved using an embodiment of the Web site creation tool. For example, a user in a company's Graphics Department may create some new content for a new Web page. Thus, the users in the Graphics Department may have user privileges that include creating/editing new content. Prior to posting the new Web page, it may be preferable to have the company's Legal Department review and approve the Web page. Thus, users in the company's Legal Department may have privileges that include approving content. Other roles-based privileges and privilege levels are possible. For example. users not employed by the company may preferably have privileges that include reading content.

Figure 13:
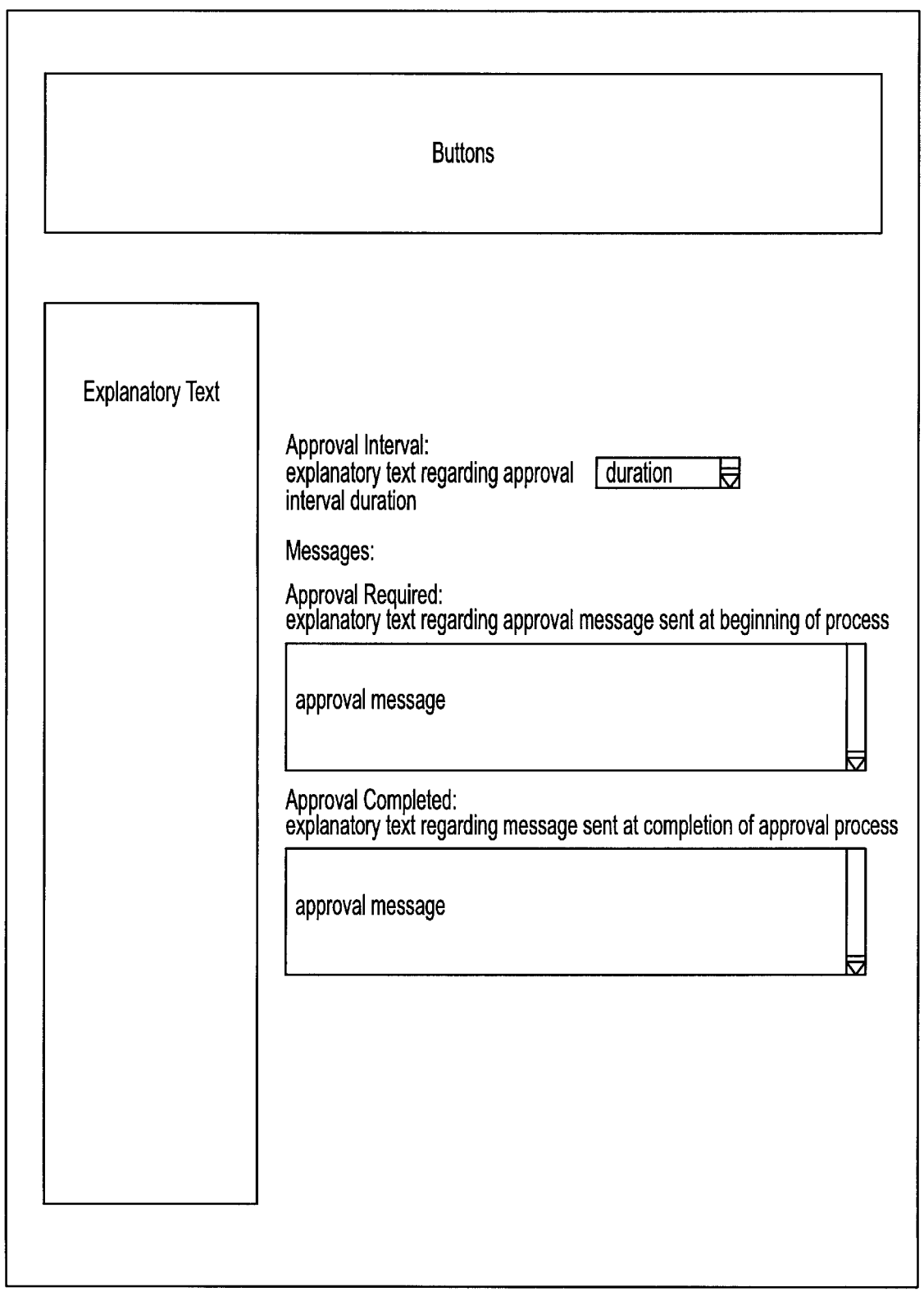
FIG. 13 is an illustration depicting a screen showing message input fields.

One embodiment of the invention provides for the automated approval of Web site content. When creating/editing content for a Web page the user may select options 104 that will automatically route the Web page to appropriate personnel for their input or approval. This is shown, for exampl, FIG. 13 which displays additional settings for the content approval process. For example, the user is able to specify parameters such as the approval interval (i.e., how long a designated approver will have to take action after being notified of a request for approval). The module may provide predefined standard messages for communicating an approval request and an approval notification. A user may be able to edit these messages. FIG. 12 illustrates another aspect of the content approval process. In this screen, the user specifies who will be involved in the approval process for the site and what their respective roles or functions will be. The user can choose to have automatic status messages sent to content creators and approvers to facilitate notification and determination of the status of creation, edits, and reviews for particular content.

Some embodiments of the invention provide for further control over approval of Web site content. For example, options 104 may include setting time limits for approval, routing order, and other parts of the approval process. In addition, privileges may be specified to any desired level. For example, approval privileges may be specified for a given object, field, link, or other content on a given Web page. Thus, a given user may be able to approve or edit the content of that particular item of content (e.g., at the field level).

Detailed below are examples of how certain features of the invention are implemented according to preferred embodiments. However, the invention is not limited to these specific implementations.

Figure 14:
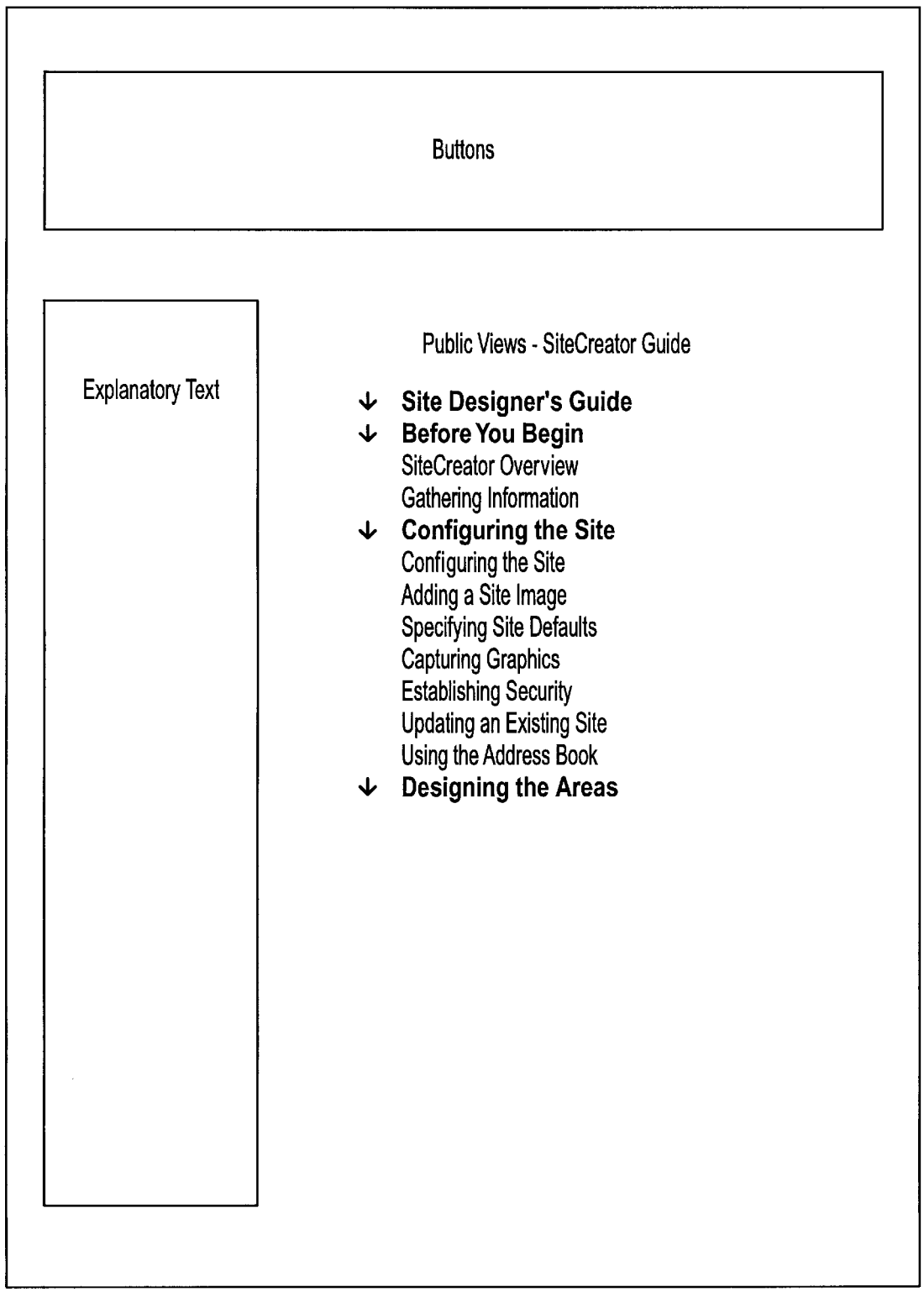
FIG. 14 is an illustration depicting a screen showing a selection menu.
Figure 15:
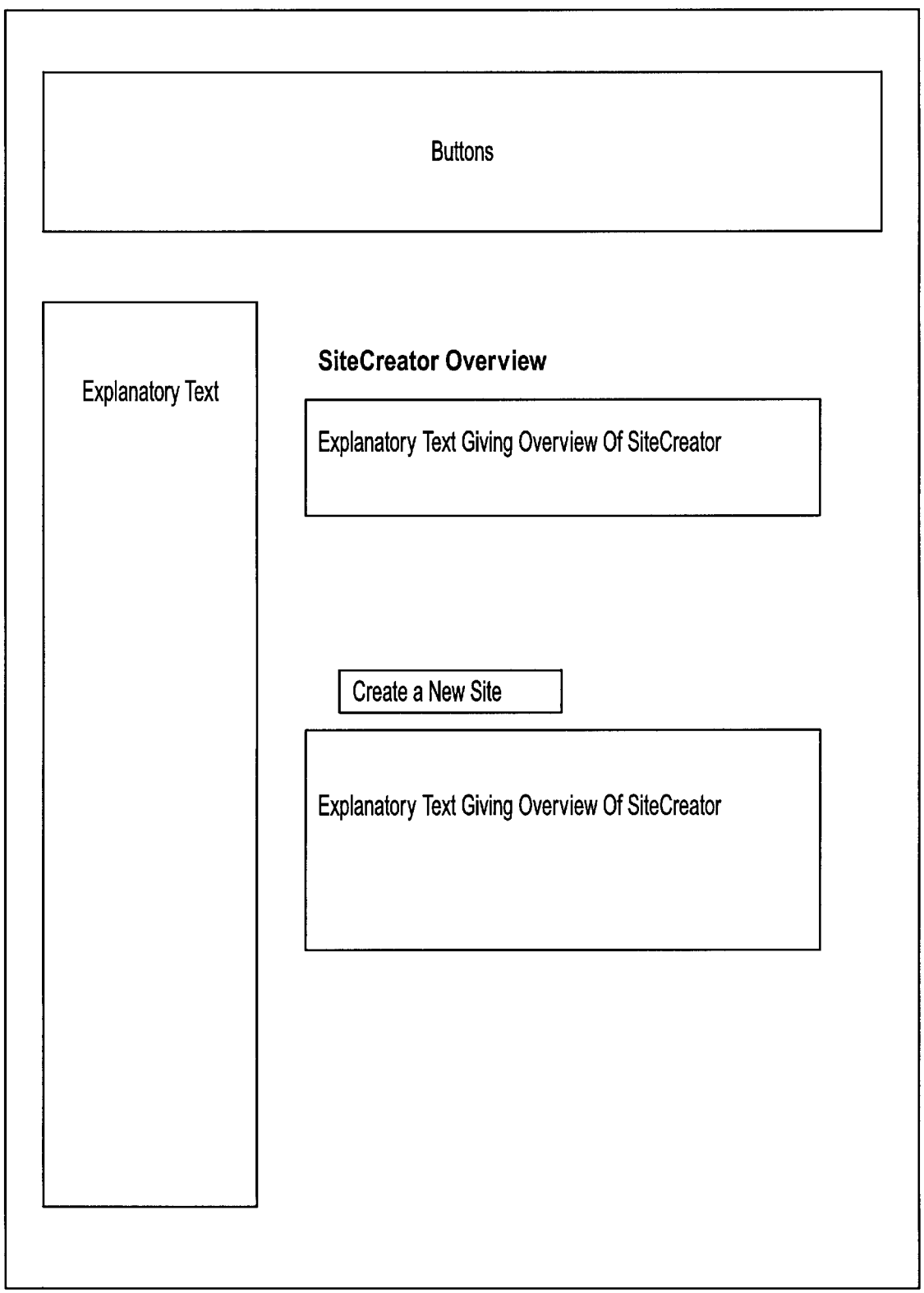
FIG. 15 is an illustration depicting a screen showing overview information.
Figure 16:
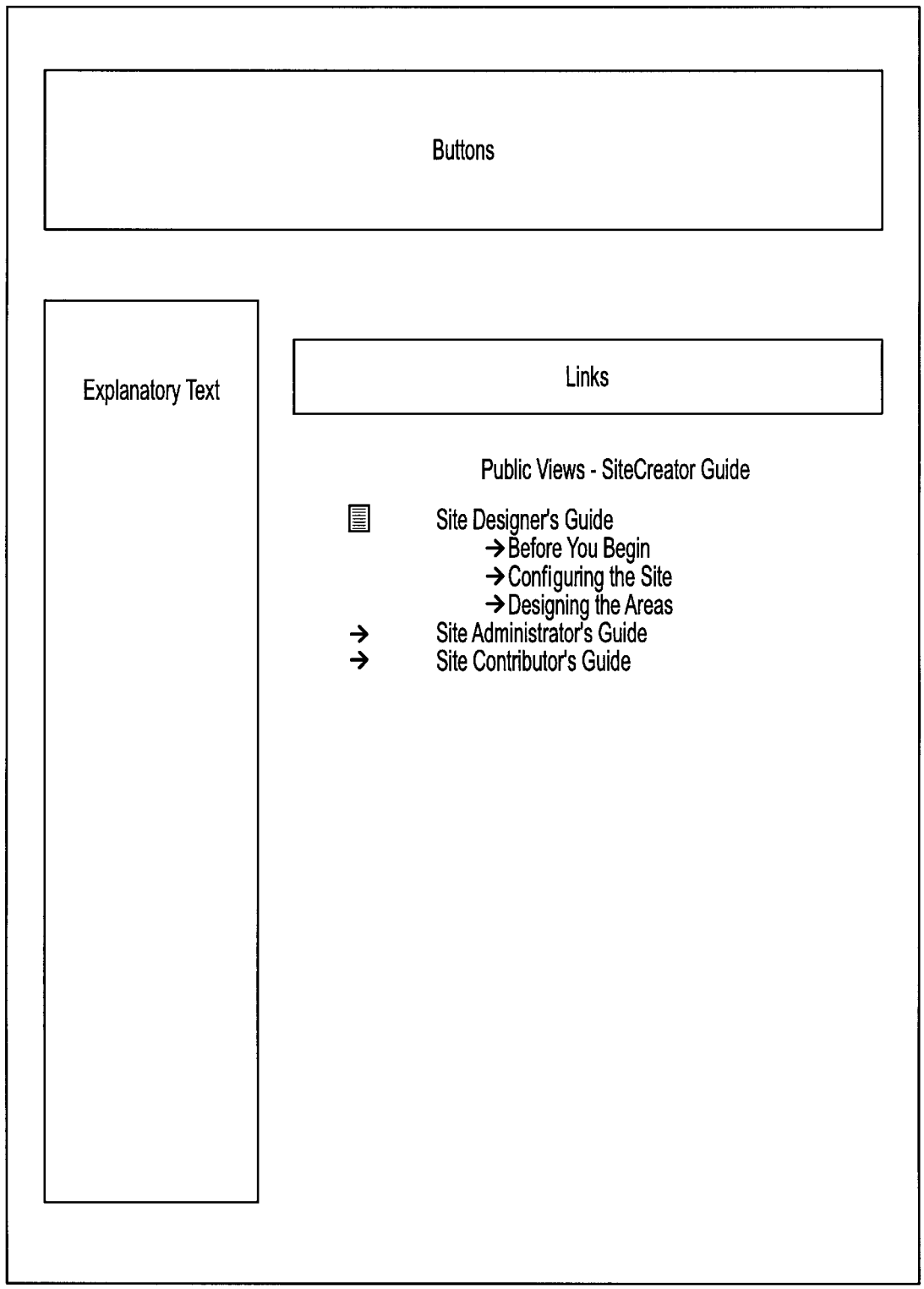
FIG. 16 is an illustration depicting a screen showing various site information.

FIG. 14 shows a page from the built-in site creator guide, which can be accessed, for example, by clicking a button on the view. The contents of the guide are divided into sections and subsections, each of which can be expanded or collapsed to show more detail. FIG. 15 shows a page from an overview section. As shown in FIG. 16, the guide has three main sections corresponding to different functional classes of users-site designers, site administrators, and site contributors.

Figure 17:
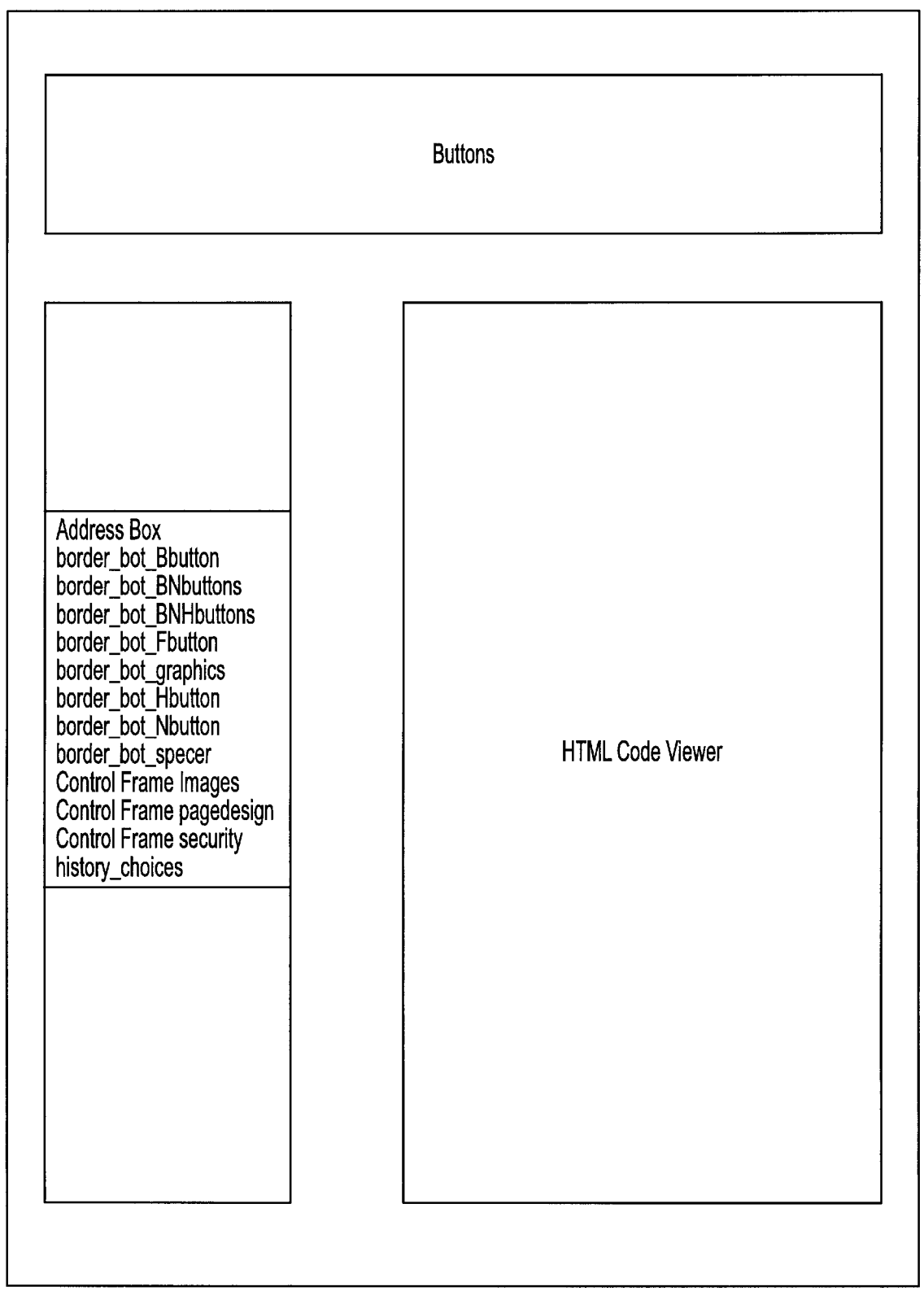
FIG. 17 is an illustration depicting a screen showing various site options.
Figure 18:
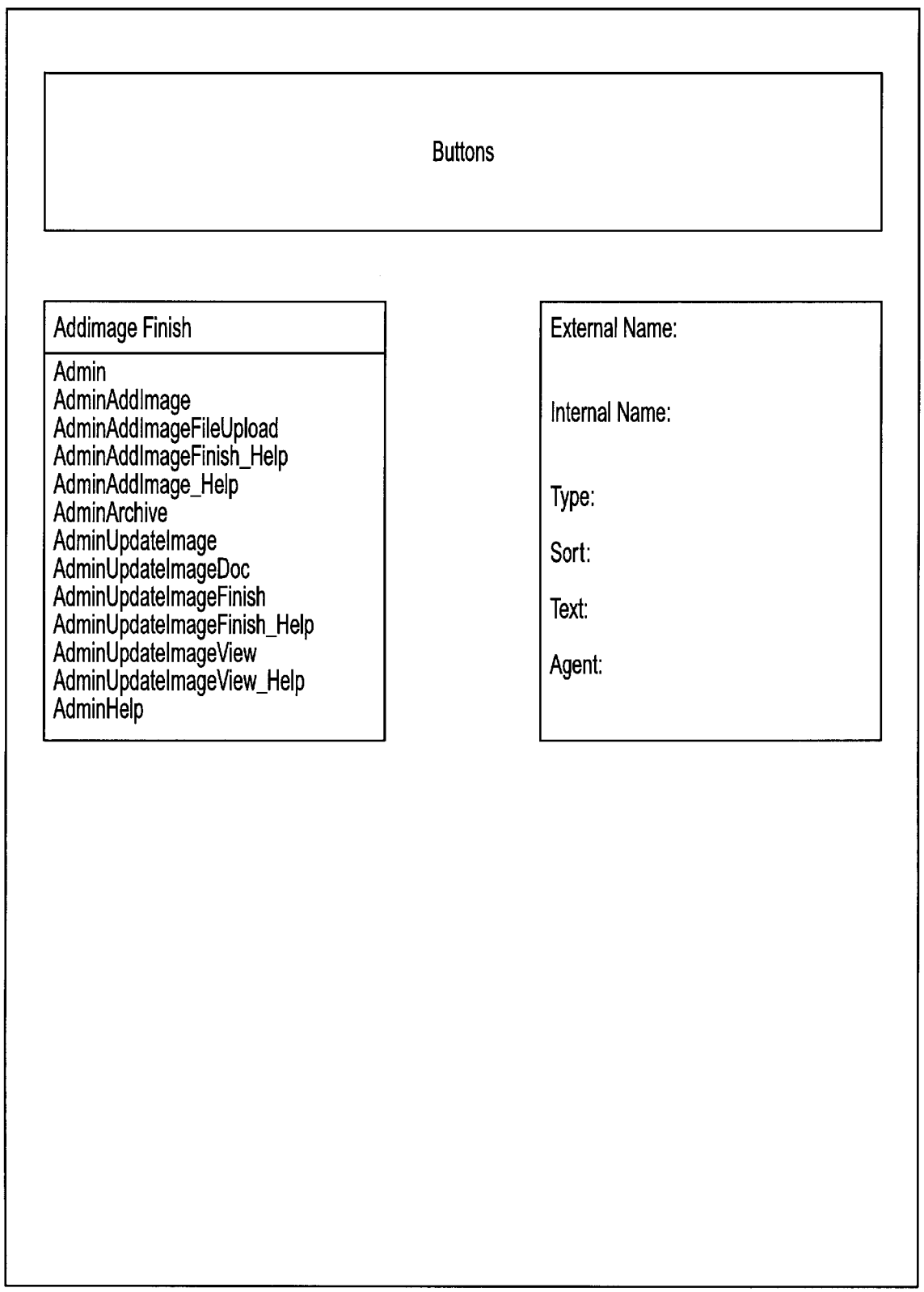
FIG. 18 is an illustration depicting a screen showing a selection menu.
Figure 19:
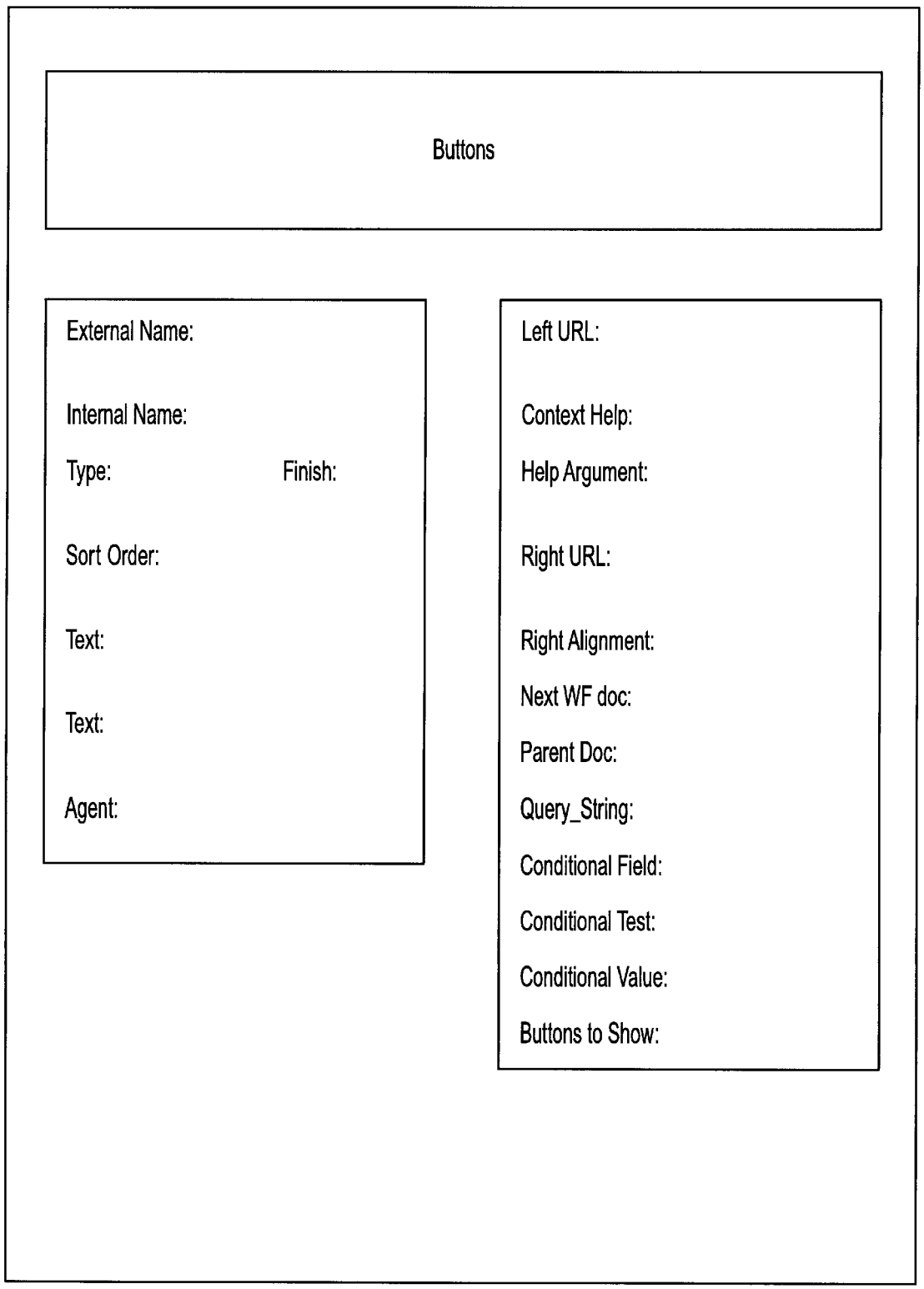
FIG. 19 is an illustration depicting a screen showing the contents of a computer desktop.
Figure 20:
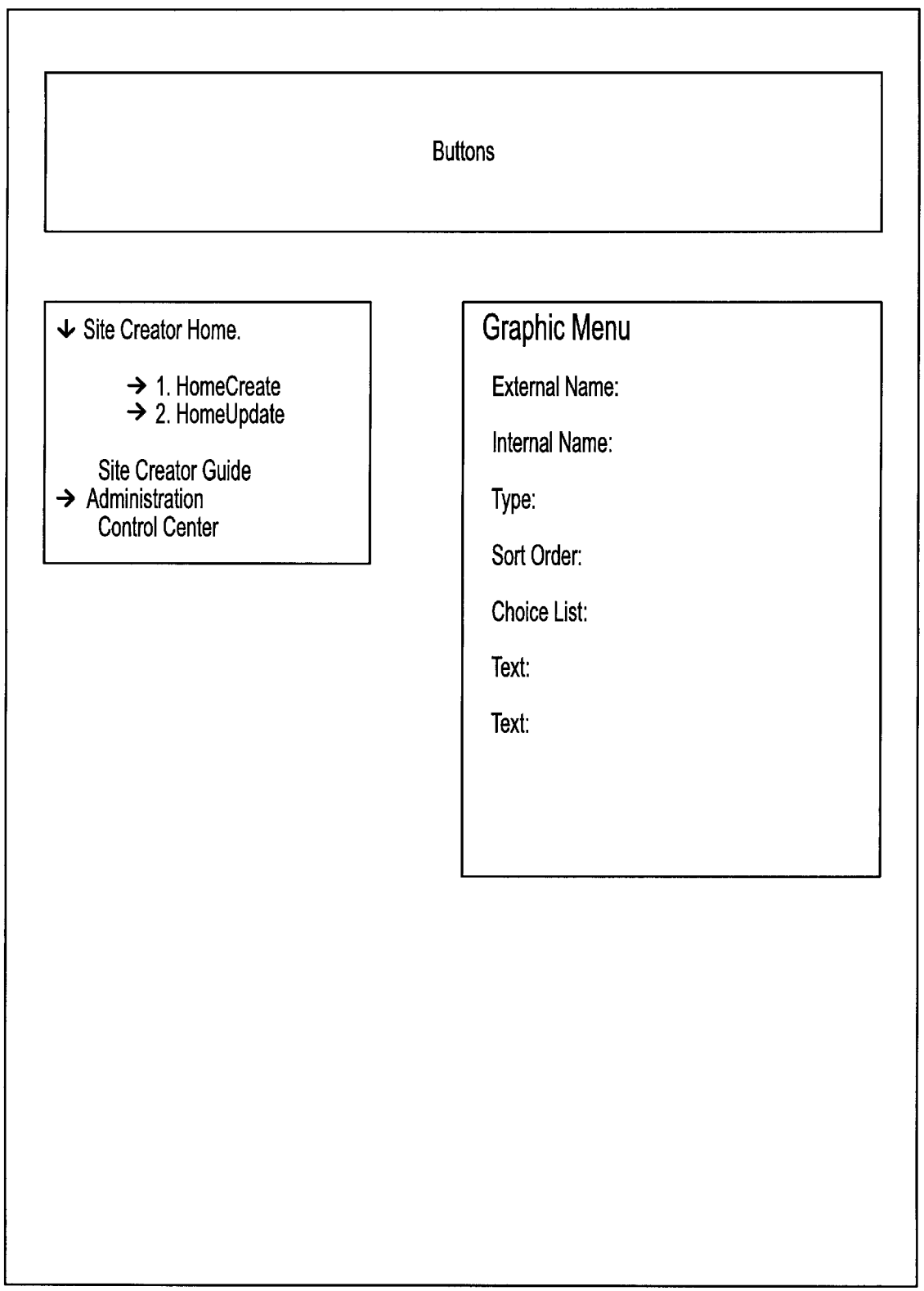
FIG. 20 is an illustration depicting a screen showing various source documents.

FIGS. 17 through 19 show other possible source documents useable with the tool. A user can add or modify documents to customize menus and settings in the module. FIGS. 20 and 21 illustrate examples of documents used to enable other features and configurations of the module. including border buttons, workflow commands, and graphics menus. These source documents can be edited by the user. Documents may be added or deleted as desired. This is done without requiring the need to write or modify software code by the user.

The invention enables a user to choose preferred customizable modules from modules that include Corporate Policies and Procedures, Feedback. Discussion, Products and Services, Frequently Asked Questions, Job/Career Opportunities databases and more.

The invention provides architectural framework and software modules for building and managing a plurality of networks and modules, for example, extensible intranets and business modules. According to a preferTed embodiment, the invention enables a user to leverage the content, collaboration, and commerce capabilities of the Lotus Domino™ server. However, other servers with the requisite functionality may be used. For example, Domino.Action™, (Domino.Merchant Sever Pack) included with Domino™, contains the site creation tool and eleven or fifteen (or any predetermined number of) template-based software modules that allow a Webmaster to create functionality in the site.

For example, the modules may include a Home Page and an About the Company page, Corporate Policies and Procedures, Discussion, Document Library and White Papers, Feedback, Frequently Asked Questions, Job/Career Opportunities, Products/Services, and Registration. One or more of these site areas may be used internally (e.g., on an intranet) and, if desired, extended to an external network (e.g., the Internet) for use by customers, business partners, and others. All employ the capabilities for interactive communication, structured collaboration, and workflow coordination. This enables threaded discussions, allows users to complete questionnaires and surveys, participate in two-way information processes, and route information quickly and easily to the people that need it.

Preferably, the tool includes a Library. The Library is a template library of design elements like, fields, forms, database views, etc., used to build the web site requested.

If a Web site needs an area that's not already provided, an authorized user can create a new custom area as follows.

First, the user creates a shell for the new area. To create the shell of the new area the following steps are performed:
1. In SiteCreator, copy, rename, and modify the Area Spec and Workflow Spec documents for an existing area;
2. Add the new area name to the Area Spec for every area that should internavigate with the new area;
3. Copy and modify the Area Profile and Workflow Profile documents that correspond to the new Spec documents;
4. Add the new area name to the Site Spec and FileUpload Spec documents;
5. Refresh the affected Spec, Profile, and File Upload documents; and
6. Upload the navigation graphics for the new area into the Library.

Next the authorized user creates the new pages. This may be done by performing the following steps:
1. In the Library, copy and edit the Page Template for an existing area to use as the foundation for the new pages;
2. In SiteCreator, copy and modify the Form Spec documents for the chosen pages;
3. Copy, modify, and refresh the Form Profile documents that correspond to the Form Spec documents copied in the previous step; and
4. In the Library, copy and edit the Input and Display subforms associated with the new pages, as necessary.

The following is an example of the process for copying and modifying the existing Document Library area to create a new Contracts area designed specifically for contracts and other legal documents.

An authorized user first identifies the existing area that comes closest to the functionality wanted in the new area and decides what types of content pages the new area should have. Then, the authorized user identifies the new area's Banner and Navigation graphics, in Basic, Contemporary, and/or Corporate styles (see FIG. 22). Next, the authorized user creates the new to Area Spec and Workflow Spec documents. The Spec documents tell SiteCreator about the contents of the Library, which serves as the object store. To begin this step, the authorized user selects the SiteCreator icon on the Notes workspace, and opens the view called System Views/All.

Then, the AreaSpec document for the prototype area (e.g., DocLibrary) is located. A copy is made and the fields are modified as necessary. Preferably, the DocumentUniqueID field is not customized because it contains the document's unique ID.

The Internal Name field contains the area's alias, or synonym, which is used in all references in forms and views. This allows an authorized user to change the area's user-visible External Name without affecting the operation of SiteCreator or the Website. An authorized user can enter the new area name, Contracts, in the Internal Name field.

The Multiple Object Lookup Name field and the Internal Name field, in most cases, contain the same value. Occasionally, however, a user may need another way to look up the object. In this case, enter Contracts (the same value as Internal Name) in the Multiple Object Lookup Name field (see FIG. 23).

An area's External Name is the user-visible name that appears in the Site Configuration profile. During the Site Design step, the external name appears in the Control pane and at the top of the each Site Design document. In this example, the user would enter Contracts Area in the External Name field.

The Description field describes the features and uses of the new area. The description is looked up in the System\View Description form. Users can see the description during the Site Configuration step when they click the button to view area descriptions.

The ConfigFields Lookup field enhances lookup performance by calculating a text list of all the elements in this section. These fields communicate to the AppAssembler what objects it needs from the Library and, in some cases, how to act on the objects.

The Views field contains the name(s) of view(s) that are specific to this area. The Views list need not be modified unless the user creates a special view for the new area.

The Name Change Style option controls the link text and titles for the various view pages. "KeywordLabel" refers to the label entered as a Content Indexing category. Contracts, for example, may be indexed by Contract Type and Expiration Date. If a Label field in the Content Indexing section contains Contract Type, the Name Change Style options produce the following link text and titles: Name Change StyleLink Text/View TitleExternalName by KeywordLabel-Contracts Area by Contract Type"By" KeywordLabelBy Contract TypeExtenal NameContracts AreaKeywordLabel-Contract Type"List by" KeywordLabelList by Contract TypeNo ChangeSelect this option for views that are hidden from users.

The Agents field contains the names of agents that are specific to this area. Unless a user creates an agent that is specific to the new area, there is no need to add to or delete from this list.

The Forms field contains the names of the standard system forms for this area. The user does not need to add to or delete from this list.

The DocumentCopyView contains the document(s) that are copied to every area. The user does not need to add to or delete from this list.

The AccomElements Lookup field is a computed field that enhances lookup performance by calculating a text list of all the elements in this section.

There are several Area Fields. The Primary Area Internal Name field, is used to enter the internal name of the area (e.g., Contracts). The Primary Area External Name is a computed field that looks up the area's external name in the view called Lookup\Specs by Internal Name (see FIG. 24).

In the Area Spec document, the Area(s) belong field should contain the internal name of every site area that should recognize and internavigate with the new area. The user may add the internal name of the new area to the list of area names. The user should also add the new area to the Area Spec document for each listed area.

The AreaFields Lookup is a computed field that enhances lookup performance by calculating a text list of all the elements in this section.

To handle The Workflow Spec document, in the System Views All view, find the WorkflowSpec document for the prototype area (DocLibrary), make a copy of it, then modify the fields as necessary.

To handle the Configuration Fields, the user replaces the existing area name (Document Library) with the new area name (Contracts) in the Internal Name, Multiple Object Lookup Name, External Name, and Description fields.

Unless the user wants to change the default Name Change Style option, there is no need to modify the fields. Views, Agents, Forms, and Document View are specified in the Area Spec document.

For the Area Fields, the user replaces the existing area name (Document Library) with the new area name (Contracts) in the Primary Area Internal Name and Area(s) Belong fields.

For the Type field, the Workflow subform should be specified.

For the DesignlHideRequesterAction, the user should Select No if the Process/Hold radio buttons are to be displayed on the Input forms for this area. The user Selects Yes to hide the Process/Hold buttons on the Input form for areas where document authors cannot edit their documents.

The DesignShowAdvancedACL fields include the options to Allow Anonymous and Allow Anyone to Author. These options permit authoring while preventing editing in, for example, a Discussion, Feedback, or Registration area. This relates to the "Workflow and Security" features.

The AreaFields Lookup field is a computed field that enhances lookup performance by calculating a text list of all the elements in this section.

Next, the user adds the new area to all AreaSpec documents. For an existing site area to recognize and internavigate with the new one, its AreaSpec document must contain the name of the new area. The AreaSpec document for each existing area is opened, the Area Fields section is expanded, and the internal name of the new area is added to the list in the Area(s) Belong field.

The user can now Create new Area and Workflow Profile documents. The Profiles take their defaults from the corresponding Specs and become the Site Design documents that users interact with during the site-creation process.

In the System Views\All view, find the AreaProfile and WorkflowProfile documents, and copy the documents that correspond to the AreaSpec and WorkflowSpec documents copied in the previous step. In both documents, specify the appropriate internal name in the Internal Name field. In the AreaProfile document, the user enters the default Link Text (in this case, Contracts) and a default Area Database File Name (Contract.nsf).

Next, the user Updates the SiteSpec and FileUploadSpec documents. To install the new area as an option on the Site Configuration profile, open the existing SiteSetup document in the SiteSpec section (still in the System ViewsAll view). Add the new area name to the Area(s) Belong field in the Area Fields section.

The user can make sure the new graphics are recognized by all the areas by opening the SiteImage document in the FileUploadSpec section and adding the new area name to the Area(s) Belong field in the Area Fields section. The user can Refresh the affected documents to make sure that all the new elements are properly created by AppAssembler and recognized by the other site areas. To refresh the affected documents:

1. In the System Views\All view, the user selects the following documents: all of the documents in the AreaSpec section all of the documents in the AreaProfile section the document for the new area in the WorkflowProfile section the SiteSetup document in the SiteProfile section the SiteImage document in the FileUploadSpec section all of the SiteImage documents in the FileUpload section 2. Make the documents refreshable by running the System\Set ProfileUpdate to Y agent from the Actions menu.

3. Refresh the documents by running the System\Refresh Selected Docs agent.

Figure 25:
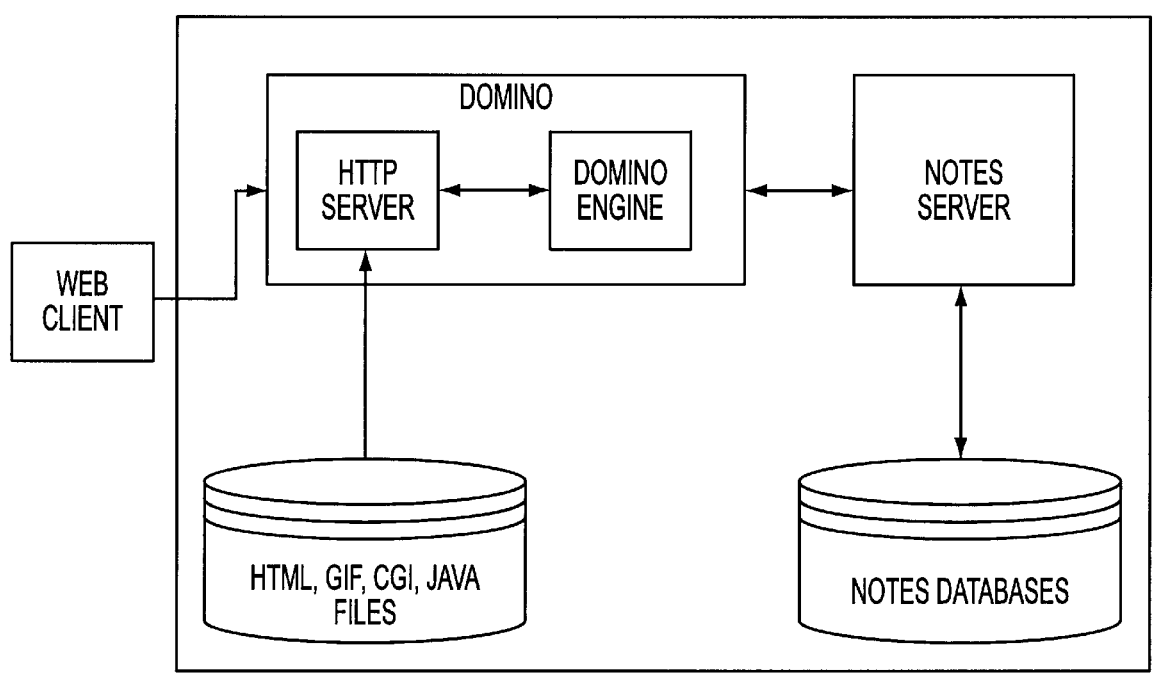
FIG. 25 is an schematic diagram illustrating one embodiment of the system.

To Install the new area's graphics, the user can perform this step from the web, using a browser that supports file upload (such as Netscape). The user starts the browser and goes to the Library database on the Domino server (FIG. 25), then performs the following steps:

1. From the list of Views, click Contributor's Menu, then click Contributor's Menu again on the resulting page;

2. Click Upload a file to open a FiletUpload form in edit mode;

3. To keep the new image together with the rest of the system navigation and banner graphics, select Domino.Action Internal as the File Category;

4. Enter a brief description then enter the name of the file desired to be attached. Do not enter the file path. If the Browse button is used to find the file on a hard drive or network, be sure to delete the path information that precedes the file name;

5. Click the Submit button to save the page; and

6. To upload another graphics file, click the Go to Contributor's menu link on the "You have successfully submitted this page" message, and repeat steps 2 through 5.

At this point, the shell of new area is created. The final step is to create the area's main page and content pa(ge(s) using the Creating New Page Types for an Area.

In SiteCreator, each page type (template) is defined by a Form Spec document and a corresponding Form Profile document. The Spec document tells AppAssembler which elements are needed from the Library (the object store). The Profile takes its defaults from the corresponding Spec. For purposes of creating a new page (template) the key Library elements are the Display subform and the Input subform. The Input subform establishes the layout and user interface for the forms that site visitors and contributors fill out; the Display subform controls the appearance of the Web page (pages may also contain System, Workflow, ActionLinks, Categorization, and other subforms).

An efficient way to create a new page type is to identify the existing page that comes closest to a desired web page, and then copy and modify the forms and subforms that define it.

Before beginning, the user should make sure that he/she is assigned to the [NetPresConfig] role in SiteCreator. Then, identify the existing content page(s) that comes closest to a user's preference. The following steps may be performed:

1. In the Library, copy and edit the Page Iemplate for an existing area to use as the foundation for the new pages;
2. Copy and edit Input and Display subforms, as necessary;
3. In SiteCreator, copy and modify the FormSpec documents for the chosen pages; and
4. Copy, modify, and refresh the Form Profile documents that correspond to the new FormSpec documents.

An example of the process, including copying and modifying the existing main page and content page from the Document Library area for use in a new Contracts area designed specifically for contracts and other legal documents will be given.

First Copy and edit a Page Template. This can be done as follows:

1. On the Notes workspace, select the library icon and choose View-Design-Forms:
2. Make a copy of the Page Template for the prototype area—in this case, Doc Library Page Template;
3. Select the new copy, then choose Design-Properties and change the form name to Contracts Page Template;
4. Change the title of the form to Contracts Page Template Form; and
5. Edit the FormlnternalName field, entering "ContractsPage" as the default value (see FIG. 23).

Next, the user should Copy and modify Display and Input subforms. To change the appearance of a new page, copy and modify the Display subform(s) used by the page. Similarly, to make changes to a page's Input form, copy and modify the Input subform used by the copied page type.

A description of "Display and Input Subforms" explains how to determine the Display or Input subform associated with a particular page type. Alternatively, the relevant Display subform(s) may be listed in the Display Subform Choices field on the page's FormSpec document in SiteCreator. The Input subform appears in the Input Subform field on the FormSpec document.

In our example, the ContractsHomePage is based on the DocLibraryHomePage, and the ContractsPage is based on the DocLibraryPage. Both pages use the following Display subforms (depending on which Page Look option is selected during the Site Design process):

DisplayBottomBullettext 1
DisplayBottomGraphic 1
DisplayBottomText1DisplaySideBulletText1
DisplaySideGraphic1
DisplaySideText1DisplayTopBulletText1
DisplayTopGraphic1
DisplayTopText1

The ContractsHomcPage uses the Input3 subform; the ContractsPage uses the Inputl subform.

Next, the user can Copy and modify the FormSpec documents. To begin this step, select the SiteCreator icon on the Notes workspace and open the view called System Views\All. Find and copy the FormSpec documents for the prototype page(s), then modify the fields as necessary. If creating pages for a new area, the user should create a main page as well as the content page(s).

Figure 26:
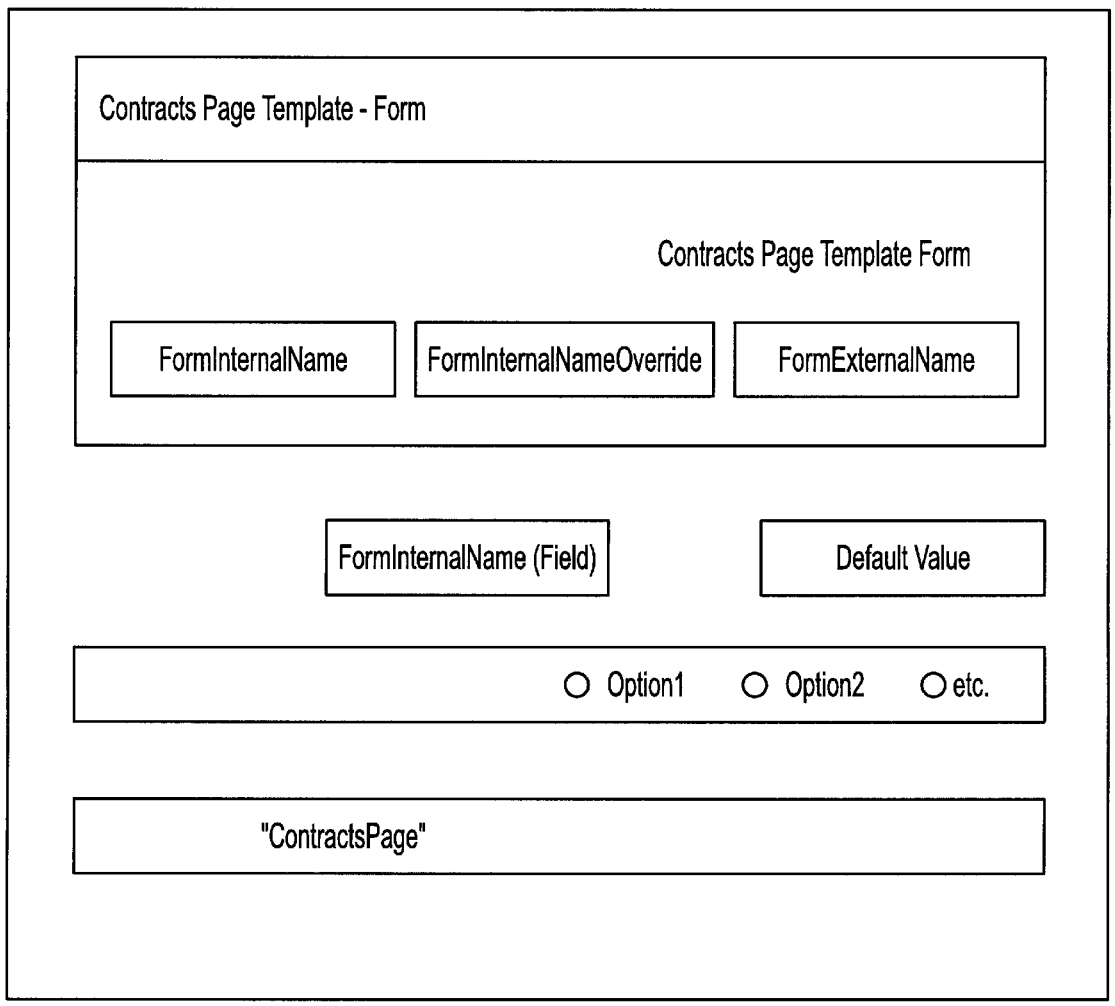
FIG. 26 is an illustration depicting a screen showing a template form.

Next, the user can replace the existing area name (DocLibrary or Document Library) with the new area name (Contracts) in the Internal Name, External Name, and Description fields. Preferably, the user should not modify the Multiple Object Lookup Name field. In most cases, the Multiple Object Lookup Name field and the Internal Name field contain the same value, but not for an area's Main Page. All main page objects belong to a superset object class called "AreaHomePage." 'I'his class name allows AppAssembler to look up the AreaHomePage template for the main page of all areas while using the Internal Name to group the finished form with the proper area—Contracts, in this case (FIG. 26).

Unless a user desires to change the default Name Change Style option, these fields do not need to be altered. Views, Agents, Forms, and Document View are specified in the Area Spec document and generally do not need to be listed in the Form Spec document.

The Name Change Style option controls the link text and titles for the various view pages. "KeywordLabel" refers to the label entered as a Content Indexing category. In our illustration, for example, Contracts is indexed by Contract Type and Expiration Date. If the Content Indexing label (the KeywordLabel) is Contract Type, the Name Change Style options produce the following link text and titles: Name Change StyleLink Text/View TitleExternalName by KeywordLabelContracts Area by Contract Type"By" KeywordLabelBy Contract TypeExternal NameContracts AreaKeywordLabelContract Type"List by" KeywordLabelList by Contract TypeNo ChangeSelect this option for views that are hidden from users.

Area Fields

Replace the existing area name (Document Library) with the new area name (Contracts) in the Primary Area Internal Name and Area(s) Belong fields.

Specific Fields

Keywords Allowed: This field specifies whether a page contains a Content Indexing subform. An area's Main Page does not, so accept the default of No. Select Yes to use the subform.

System Subform: This field contains the internal name of the System subform for this object. The invention preferably contains one System subform, so accept the default of System.

ActionLinks Subform: Thc ActionLinks subform (preferably, there is only one) contains the graphical navigation links that enable Composers and Approvers to access the Contributor's Menu.

Input Subform: The Input subform controls the layout and operation of the forms filled out by site visitors and contributors. If a user creates a new Input subform for this page type, specify its internal name here; otherwise, accept the default Input subform.

Display Subform Choices: This field contains a list of Display subforms that work with this page type. These display choices appear in the Page Layout dialog on the Site Design document. If a new Display subform is created for this page type, add its internal name to the list.

Workflow Subform: This field contains the internal name of the Workflow subform for this object. The invention contains only one Workflow subform, so accept the default of Workflow.

Form Template: All main pages are based on the form template called AreaHomePageTemplate, so the value of this form is preferably not changed by the users of this system. Alternatively, the user may specify the internal name of the Page Template copied and renamed in the first step—in our example. ContractsPageTemplate.

Document Type: Accept the default of Parent. The Child option is appropriate for subordinate page types only; not for a main page.

For FormSpecificFields Lookup: This computed field enhances lookup performance by calculating a text list of all the elements in this section.

Configuration Fields

Content Page—Configuration Fields: replace the existing area name (Document Library) with the new area name (Contracts) in the Internal Name, Multiple Object Lookup Name, External Name, and Description fields.

Page type (internal name)

Content Indexing

Categorization subform

AboutPage

CorpPolicyProcedurePage

DocLibraryPage

HomePage

JobPostingDoc

ProdInfo

WhitePaperPage

CategorizationQuestions

DiscussionPage

DiscussionCategorizationQuestions

FAQsPage

FAQsCategorizationQuestions

FeedbackPage

FeedbackCustomQuestions

RegistrationPage

RegistrationCustomQuestions

To create new Form Profile documents, in the System Views\All view, find and copy the FormProfile documents that correspond to the FormSpec documents. In each document, specify the appropriate internal name in the Internal Name field.

Refresh The Profile Documents

To update the new Profile documents' lookup fields with the values from the new Spec documents, it is recommended that the documents be refreshed. One method of refreshing the documents is as follows:

1. Select the new Profile documents in the view pane;
2. Make the documents refreshable by running the agent called System\Set ProfileUpdate to Y; and
3. Refresh the documents by running the System\Refresh Selected Docs agent.

Another aspect of the invention is the ability to easily create, edit, and approve content. The following steps can be performed according to a preferred embodiment of the invention to keep a site's content current:

A Web site according to the invention may comprise one or more information areas, each of which contains related content. For example, a Products/Services area might contain product descriptions, product reviews, and spec sheets. A Corporate Policies and Procedures area might contain policy guides, employee manuals, and benefits information. A site may comprise several of the following areas: Home Page, About the Company, Corporate Policies and Procedures, Discussion, Document Library, Feedback, Frequently Asked Questions, Job Postings, Products and Services, Registration, White Paper(s). Roles, and other areas. To maintain site security, the invention allows the site manager or Webmaster to assign roles that define users' privileges. The following roles, which are assigned in the Security/Approval profile for each area, control who is allowed to add and edit new pages, who must approve new pages before they are posted, and who can read pages. Composers are users that create/edit new content. Approvers are users that can participate in the approval process. Readers are users that can read pages but not create or edit content. Exceptions: In Discussion area, Readers can create and read pages, but cannot edit them. In Registration and Feedback areas, Readers can create pages but cannot read or edit them.

Roles are assigned separately for each area so a user may not have the same access to every area. For example, a Composer for the Products/Services area may not be able to compose new pages for the Job Postings area.

In the Security/Approval profile for each area, the site manager or area manager can specify a predetermined (e.g., five) approval steps and can assign a different approver (or set of approvers) for each step.

With respect to creating content pages, a user assigned to the Composers role for a particular area, can, among other things, add or edit content on the area's main page (the first page to appear after the link to that area is clicked) or create or edit new content pages in the area.

To do so, the user starts the Web browser and goes to the desired area of the site. For example, a Composer for the Document Library area would go to the site's Home page and follow the Document Library link.

To add content to an area's main page, the user performs the following steps:

1. Click the Edit/Approve This Page link. If a user is not assigned to the Composers or Approvers role, that user will not see this link;
2. Select a logo or banner for the page from the drop-down list; and
3. Enter a title, subtitle, and other content to the page. When finished, select Process, then click Submit.

If the Security/Approval profile for the area specifies zero approval steps, then the new document becomes public immediately. If the Security/Approval profile specifies one or more approval steps, the page must be approved by someone who is named as an Approver for each approval step. While a document is awaiting approval, Composers cannot access it.

To create a new content page, the following steps may be performed:

1. Go to the area's main page and click the To Contributor's Menu link. If the user is not assigned to the Composers or Approvers role, that user will not see this link;
2. Click the link to Compose one of the available page types; and After completing the page, select Process, then click Submit.

Note: If the Security/Approval profile for the area specifies one or more approval steps, the page must be approved by someone who is named as an Approver for each approval step.

While a document is awaiting approval, Composers cannot access it, although the system may be configured to allow access.

Figure 27:
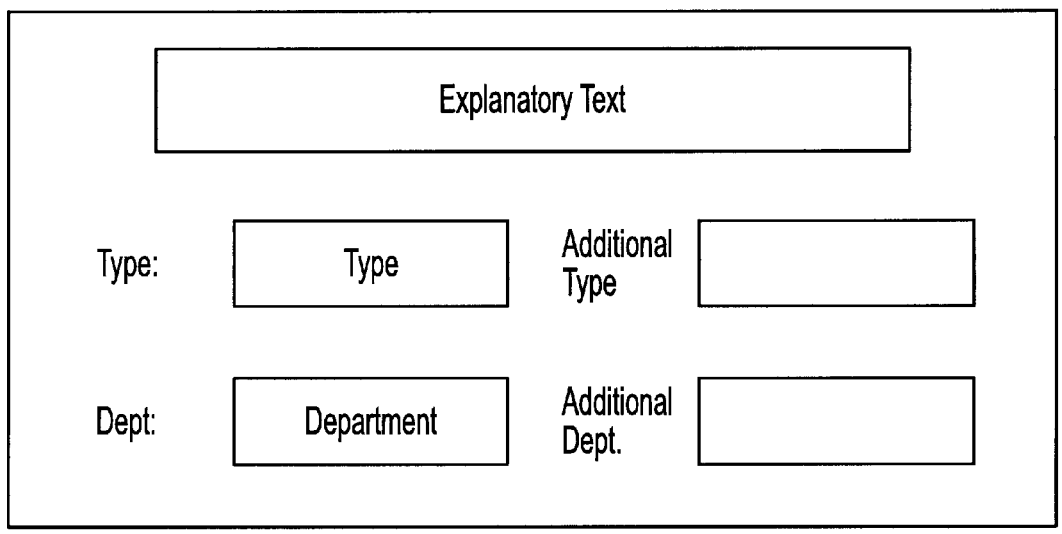
FIG. 27 is an illustration depicting a screen showing information input fields.

The invention also enables Indexing of content pages. Most content pages provide one or more fields designed to help index the new information. If a page under construction contains such fields, a category should be selected (or a new category entered, if that is an option) from at least one drop-down list. Some content pages allow categories to be entered in case the page falls into a category that isn't listed (see FIG. 27).

Pages are indexed by category, so categorizing a page properly ensures that it appears in every relevant index. This, in turn, helps readers find information more quickly. For example, in a Document Library that contains many types of documents, it may be easier to locate a specific document in a list organized by document type than in a list organized by title.

The invention also facilitates editing content pages. If a user is assigned to the Composers role for a particular area, that user can edit not only the area's main page but also any approved page in the area. To edit a page, the user starts the Web browser and goes to the page to be edited. Then, the following steps may be performed.

1. Click the Edit/Approve This Page link. (If the user is not assigned to the Composers or Approvers role, that user will not see this link.)
2. After the desired changes have been made, select Yes to Republish the Page, then click Submit.

According to another aspect of the invention, when a user edits and republishes a page, the page may become public immediately. It is not necessary to repeat the approval process even if the Security/Approval profile for the area specifies one or more approval steps, although it may be repeated if desired.

The invention also includes features to facilitate approving content pages. According to one embodiment, an Approver for a particular area, must approve each new page that is submitted for that area before it can be posted publicly. The area's Security/Approval profile may specify more than one approval step, and/or it may specify more than one person for each approval step. Preferably, only one person approves a page, even if several people are designated in the same approval step. After one designated approver approves the page, the page is either published or—if the Security/Approval profile specifies more than one approval step—passed along to the next approval step. This can be done automatically via electronic routing. If the Security/Approval profile specifies Automatic Notification, all approvers for the current approval step receive an e-mail message alerting them of a page requiring approval. The message contains a link to the page requiring approval. If the message is not automatically routed, the page to approve can be viewed by clicking the To Contributor's Menu link on the area's main page. From there, the link to one of the Approval Process views may be clicked. The approval process may include the following steps.

1. Open the page desired to be approved and click Edit/Approve This Page. (If the user is not assigned to the Composers or Approvers role, that user will not see this link.)
2. After reviewing and/or editing the content, scroll down the page to the Approval Section. Select an Approver Action, then click Submit.

Another aspect of the invention is the use of Input and Display Subforms. A Domino.Action page is composed of multiple subforms, including System, Workflow, ActionLinks Display, and Input subforms. For the purposes of customizing pages, the key subforms are Input and Display. The Input subform establishes the layout and user interface for the forms that site visitors and contributors fill out; the Display subform controls the appearance of a Web page.

On the final form that AppAssembler builds and places into the site database, the Input subform appears before the Display subform and determines the content (title, subtitle, and text) of the completed page.

The Input and Display subforms reside in the Library. To copy an Input or Display subform, select the Library icon on the Notes workspace, choose View—Design, and click Subforms.

There are at least two ways to determine which Input subform to copy, but a user should know the page type of the page that comes closest to what is preferred.

If a user believes a page may have been modified to use a different Input subform, check the Input form specified in SiteCreator. In the System Views\All view, open the FormSpec document for the page type desired. The Input Subform field in the Specific Fields section contains the name of the Input subform currently used for that page type.

If the page type is known, a user can quickly determine which Display subform(s) a page uses by looking in SiteCreator. Using the SiteCreator method, in SiteCreator. go to the System Views\All view, and open the FormSpec document for the page type desired. In the Specific Fields section, the Display Subform Choices field lists all of the Display subforms that work with the page type and appear as options in the Page Layout dialog on the Site Design document. In the Library method (which enables the user to skip SiteCreator and go directly to the Library to both identify and copy the subform(s) a user wishes to modify), the number at the end of each subform title identifies the page type, as outlined in the following table: NumberPage Type1Main page for all areas; any page not mentioned below2Spec Sheet3Product Review4Product Information Page with Product graphic5Discussion Main Topic or Discussion Response6Feedback7FAQs The subform title describes the layout. In the example of FIG. 28, "layout" refers to the location (side, bottom, or top) and type (text bulleted text, or graphic) of the navigation links.

Figure 29:
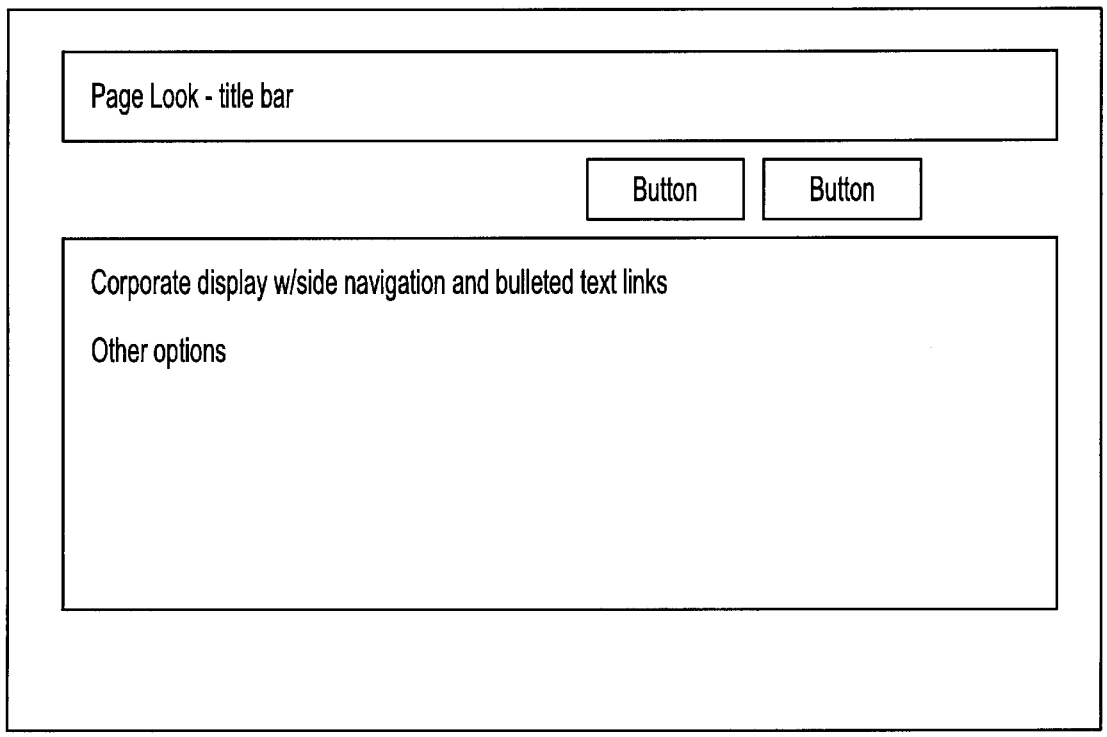
FIG. 29 is an illustration depicting a screen showing options.

These characteristics appear in the Page Look option in the Site Design document for the page. For example, the DisplaySideBulletText1 subform is used for an area's main page when the selected layout (Page Look) is Corporate (or Basic or Contemporary) display w/side navigation and bulleted text links as shown in FIG. 29.

Other embodiments and uses of the invention will be apparent to those skilled in the art from consideration of the specification and practice of the invention disclosed herein. The specification and examples should be considered exemplary only. The intended scope of the invention is only limited by the claims appended hereto.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer system comprising a tool for creating a Web site having user specified features, comprising:
    means for storing a library of templates corresponding to a plurality of predefined features available in a Web site, wherein said plurality of predefined features further comprise one or more workflow options that permit collaborative and distributed authoring of Web site content, wherein the one or more workflow options further comprise:
        means for setting a number of approval levels that the Web site content is to receive prior to inclusion in the Web site;
        means for designating an authorized content approver from which a predetermined level of approval must be granted before the Web site content can be included on the Web site;
        means for assigning automatic routing rules for routing the Web site content according to a predetermined approval schedule;
        means for assigning a time period for action by which the Web site content must be acted upon; and
        means for requesting notification of whether a predetermined event has occurred;
    means for enabling a web site creator using the tool to select the desired ones of said plurality of predefined features for a Web site, and to select one or more of said one or more workflow options;
    means for automating workflow according to said one or more of said one or more workflow options selected wherein said means for automating workflow further comprises:
        means for restricting the collaborative and distributed authoring according to the one or more workflow options selected;
        means for enabling approval of the Web site content according to the one or more workflow options selected;
        means for routing a Web page according to the one or more workflow options;
        means for determining whether any said time period for action has expired;
        means for notifying upon the occurrence of said predetermined event; and
        consolidation means for collecting the Web page upon completion of the routing according to the one or more workflow options selected;
    means for building a Web site based on the templates corresponding to the selected features and the collected Web page.

2. The computer system according to claim 1, wherein said templates comprise HTML code.

3. The computer system according to claim 1, wherein said templates comprise HTML, code, and one or more templates include predefined formatting for one of said predefined features.

4. The computer system according to claim 1, wherein said templates comprise HTML code, and one or more templates include predefined formatting for one of said predefined features, and fields that require input from the web site creator to customize the feature for the web site being created by the web site creator.

5. The computer system according to claim 1, wherein the means for building the web site generates a plurality of web pages based on the templates corresponding to the selected features, and further comprising means for enabling the web site creator to customize the web pages with specific content without requiring the web site creator to write or modify software code.

6. The system according to claim 1, wherein the authorized content approver is assigned an access privilege and wherein the privilege is a create/edit/approve privilege.

7. The system according to claim 6, wherein the privilege is a read only privilege.

8. A method of using a tool for creating a Web site, comprising:
    storing a library of templates corresponding to a plurality of predefined features available in a web site, wherein said plurality of predefined features further comprise one or more workflow options that permit collaborative and distributed authoring of Web site content, wherein the one or more workflow options further comprise:
        means for setting a number of approval levels that the Web site content is to receive prior to inclusion in the Web site;
        means for designating an authorized content approver from which a predetermined level of approval must be granted before the Web site content can be included on the Web site;
        means for assigning automatic routing rules for routing the Web site content according to a predetermined approval schedule;
        means for assigning a time period for action by which the Web site content must be acted upon; and
        means for requesting notification of whether a predetermined event has occurred;
    enabling a web site creator using the tool to select the desired ones of said plurality of predefined features for a Web site, and to select one or more of said one or more workflow options;
    forwarding one or more Web pages to subsequent users for action wherein said step of forwarding is accomplished according to said one or more of said one or more workflow options selected;
    collecting the Web pages; and, building a Web site based, at least, the Web pages collected and the templates corresponding to the selected features.

9. The method of claim 8, further comprising the step of notfying at least one of the plurality of users that an action In connection with the one or more Web paces is requested.

10. The method of claim 8, further comprising the step of providing each user with a predetermined time in which to take action.

11. The method of claim 8, further comprising the step of consolidating a plurality of web pages based on templates corresponding to selected features, and further comprising the step of customizing the plurality of web pages with specific content without requiring the web site creator to write or modify software code.

12. An electronic storage medium having code embodied therein for creating a Web site, said computer usable medium comprising:
    code that causes a processor to store a library of templates corresponding to a plurality of predefined features available in a web site, wherein said plurality of predefined features further comprise one or more workflow options that permit collaborative and distributed authoring of Web site content, wherein the one or more workflow options further comprise:
        code for setting a number of approval levels that the Web site content is to receive prior to inclusion in the Web site;
        code for designating an authorized content approver from which a predetermined level of approval must be granted before the Web site content can be included on the Web site;

code for assigning automatic routing rules for routing the Web site content according to a predetermined approval schedule;

code for assigning a time period for action by which the Web site content must be acted upon; and code for requesting notification of whether a predetermined event has occurred;

code that causes a processor to enable a web site creator using the tool to select the desired ones of said plurality of predefined features for a Web site, and to select one or more of said one or more workflow options;

code that causes a processor to forward one or more Web pages to subsequent users for action by routing the Web pages to a plurality of users;

code that causes a processor to collect the Web pages; and code that causes a processor to build a Web site based, at least, on the Web pages collected and the templates corresponding to the selected features.

13. The medium of claim 12, further comprising code that causes a processor to notifies at least one of the plurality of users that an action in connection with the one or more Web pages is requested.

14. The medium of claim 12, further comprising code that causes a processor to notify each user with a predetermined time in which to take action.

15. The medium of claim 12, further comprising code that causes a processor to enable the web site creator to customize the one or more web pages with specific content without requiring the web site creator to write or modify software code.

16. A computer system comprising a tool for creating a Web site, comprising:

at least one storage device that stores a library of templates corresponding to a plurality of predefined features available in a web site, wherein said plurality of predefined features further comprise one or more workflow options that permit collaborative and distributed authoring of Web site content, wherein the one or more workflow options further comprise:

an approval level setter for setting a number of approval levels that the Web site content is to receive prior to inclusion in the Web site;

a content approver designator for designating an authorized content approver from which a predetermined level of approval must be granted before the Web site content can be included on the Web site;

a routing rules assignor for assigning automatic routing rules for routing the Web site content according to a predetermined approval schedule;

a time period assignor for assigning a time period for action by which the Web site content must be acted upon; and a notifier for requesting notification of whether a predetermined event has occurred;

a selection module that enables a web site creator using the tool to select the desired ones of said plurality of predefined features for a Web site, and to select one or more of said one or more workflow options;

a workflow automation module that automates workflow according to said one or more of said one or more workflow options selected wherein said workflow automation module further comprises:

a restictor module for restricting the collaborative and distributed authoring according to the one or more workflow options selected;

an approval module for enabling approval of the Web site content according to the one or more workflow options selected;

a routing module for routing a Web page according to the one or more workflow options;

a time period module for determining whether any said time period for action has expired;

a notification module for notifying upon the occurrence of said predetermined event; and a consolidation module for collecting the Web page upon completion of the routing according to the one or more workflow options selected;

a Web site assembler that builds a Web site based on the templates corresponding to the selected features.

17. The computer system according to claim 16, wherein the consolidation module consolidates a plurality of web pages based on templates corresponding to selected features, and further comprising a customizing module for enabling the web site creator to customize the plurality of web pages with specific content without requiring the web site creator to write or modify software code.

* * * * *

UNITED STATES PATENT AND TRADEMARK OFFICE
CERTIFICATE OF CORRECTION

PATENT NO. : 6,308,188 B1
DATED : October 23, 2001
INVENTOR(S) : Richard S. Bernardo et al.

It is certified that error appears in the above-identified patent and that said Letters Patent is hereby corrected as shown below:

Column 22,
Line 37, after "least" insert -- upon --.
Line 40, delete "notfying" and insert therefor -- notifying --;
Line 41, delete "paces" and insert therefor -- pages --.

Column 23,
Line 21, delete "notifies" and insert -- notify --.

Column 24,
Line 20, delete "restictor" and insert therefor -- restrictor --.

Signed and Sealed this

Ninth Day of July, 2002

*Attest:*

JAMES E. ROGAN